(12) United States Patent
Paris et al.

(10) Patent No.: US 11,523,460 B2
(45) Date of Patent: Dec. 6, 2022

(54) METHOD AND APPARATUS FOR ADAPTIVE DISCONTINOUS RECEPTION CONFIGURATION

(71) Applicant: NOKIA TECHNOLOGIES OY, Espoo (FI)

(72) Inventors: Stefano Paris, Vanves (FR); Andrea Marcano, Antony (FR); Klaus Ingemann Pedersen, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/316,132

(22) Filed: May 10, 2021

(65) Prior Publication Data
US 2022/0361281 A1  Nov. 10, 2022

(51) Int. Cl.
*H04W 76/28* (2018.01)
*H04W 56/00* (2009.01)
*H04W 52/02* (2009.01)

(52) U.S. Cl.
CPC ....... *H04W 76/28* (2018.02); *H04W 52/0229* (2013.01); *H04W 56/001* (2013.01)

(58) Field of Classification Search
CPC ............ H04W 76/28; H04W 52/0229; H04W 56/001
See application file for complete search history.

(56) References Cited

U.S. PATENT DOCUMENTS

| 2016/0081020 | A1  | 3/2016 | Rahman et al. |
| 2020/0037396 | A1  | 1/2020 | Islam et al. |
| 2020/0120596 | A1  | 4/2020 | Yu et al. |
| 2022/0132527 | A1* | 4/2022 | Cui .................. H04W 72/1231 |
| 2022/0140881 | A1* | 5/2022 | Zhang ................ H04W 76/19 370/329 |
| 2022/0191966 | A1* | 6/2022 | Wang ................ H04W 52/0216 |

FOREIGN PATENT DOCUMENTS

WO  WO 2020/060890 A1  3/2020

OTHER PUBLICATIONS

"3rd Generation Partnership Project; Technical Specification Group Radio Access Network; NR; Medium Access Control (MAC) protocol specification (Release 16)", 3GPP TS 38.321 v16.4.0, (Mar. 2021), 157 pages.

(Continued)

*Primary Examiner* — Kyaw Z Soe
(74) *Attorney, Agent, or Firm* — Alston & Bird LLP

(57) ABSTRACT

Techniques for determining a discontinuous reception configuration are disclosed. A user equipment may receive a discontinuous reception configuration from a network entity. The user equipment may select one or more discontinuous reception parameters to modify based at least in part on the received indication of a particular data burst class to be transmitted. The user equipment may receive a data burst and a selection command from the network entity. The user equipment selects one or more discontinuous reception parameters to modify based at least in part on the received indication of whether to apply the one or more adaptive parameters after the transmission of a current data burst is complete.

20 Claims, 16 Drawing Sheets

(56) References Cited

OTHER PUBLICATIONS

"3rd Generation Partnership Project; Technical Specification Group Radio Access Network; NR; Radio Resource Control (RRC) protocol specification (Release 16)", 3GPP TS 38.331 v16.4.1, (Mar. 2021), 949 pages.

Kim et al., "Statistical traffic modeling of MPEG frame size: Experiments and analysis", Journal of Systemics, Cybernetics and Informatics, vol. 7, No. 6, (2009), pp. 54-59.

Qualcomm Incorporated et al., "Feasibility Study on Extensions to Typical Traffic Characteristics", 3GPP TSG SA WG-4 Meeting #107, S4-200334, (Jan. 20-24, 2020), 4 pages.

Qualcomm Incorporated, "[FS_XRTraffic] From Traces to Statistical Models", 3GPP TSG-SA4 Meeting #112e, S4-210073, (Feb. 1-10, 2021), 5 pages.

Qualcomm, "New SID on XR Evaluations for NR", 3GPP TSG RAN Meeting #86, RP-193241, (Dec. 9-12, 2019), 6 pages.

Sharma et al., "Performance Analysis and Adaptive DRX Scheme for Dual Connectivity", IEEE Internet of Things Journal, vol. 6, No. 6, (Dec. 2019), pp. 10289-10304.

\* cited by examiner

700

```
┌─────────────────────────────────────────────────────────────┐
│ RECEIVING A DISCONTINOUS RECEPTION CONFIGURATION FROM A     │
│ NETWORK ENTITY                                              │
│ 701                                                         │
└─────────────────────────────────────────────────────────────┘
                              ↕
┌─────────────────────────────────────────────────────────────┐
│ SELECTING ONE OR MORE DISCONTINOUS RECEPTION PARAMETERS TO  │
│ MODIFY BASED AT LEAST IN PART ON A RECEIVED INDICATION OF   │
│ WHETHER TO APPLY THE ONE OR MORE ADAPTIVE PARAMETERS        │
│ 702                                                         │
└─────────────────────────────────────────────────────────────┘
                              ↕
┌─────────────────────────────────────────────────────────────┐
│ RECEIVING ONE OR MORE SELECTION COMMANDS FROM THE NETWORK   │
│ ENTITY                                                      │
│ 703                                                         │
└─────────────────────────────────────────────────────────────┘
                              ↕
┌─────────────────────────────────────────────────────────────┐
│ SELECTING ONE OR MORE DISCONTINOUS RECEPTION PARAMETERS TO  │
│ MODIFY BASED AT LEAST IN PART ON THE RECEIVED INDICATION OF │
│ WHETHER TO APPLY THE ONE OR MORE ADAPTIVE PARAMETERS AFTER  │
│ THE TRANSMISSION OF THE CURRENT DATA BURST IS COMPLETE      │
│ 704                                                         │
└─────────────────────────────────────────────────────────────┘
                              ↕
┌─────────────────────────────────────────────────────────────┐
│ RECEIVING ONE OR MORE DATA BURSTS FROM THE NETWORK ENITY    │
│ 705                                                         │
└─────────────────────────────────────────────────────────────┘
```

```
┌─────────────────────────────────────────────────┐
│  RECEIVING AN INDICATION OF A BURST CLASS PATTERN │
│                      901                          │
└─────────────────────────────────────────────────┘
                         ↕
┌─────────────────────────────────────────────────┐
│ SELECTING A DISCONTINOUS RECEPTION CONFIGURATION PATTERN │
│ AUTOMATICALLY BASED AT LEAST IN PART ON THE NEXT ANTICIPATED DATA │
│                   BURST CLASS                     │
│                      902                          │
└─────────────────────────────────────────────────┘
```

1102  
RAN node

1. ADAPTIVE-DRX (aDRX) CONFIGURATION NON-INTEGER PERIODICITY

2. END OF CONNECTION CONFIGURATION

3. ACTIVATION OF DRX ADAPTATION 0 (P-FRAME) — TRANSMISSION OF I-FRAME — DRX CYCLE 1

4. ACTIVATION OF DRX ADAPTATION 0 (P-FRAME) — TRANSMISSION OF P-FRAME — DRX CYCLE 2

5. ACTIVATION OF DRX ADAPTATION 0 (P-FRAME) — TRANSMISSION OF P-FRAME — DRX CYCLE 3

6. ACTIVATION OF DRX ADAPTATION 1 (I-FRAME)+RESYNCHRONIZATION — TRANSMISSION OF P-FRAME — DRX CYCLE 4

7. ACTIVATION OF DRX ADAPTATION 0 (P-FRAME) — TRANSMISSION OF I-FRAME — DRX CYCLE 5

CAUSING ONE OR MORE RESYNCHRONIZATION PARAMETERS TO BE PROVIDED TO A USER EQUIPMENT
1201

CAUSING A RESYNCHRONIZATION COMMAND TO BE PROVIDED TO THE USER EQUIPMENT
1202

RECEIVING A RESYNCHRONIZATION COMMAND FROM THE NETWORK ENTITY
1301

MODIFYING ONE OR MORE DRX PARAMETERS OF A CURRENT DISCONTINOUS RECEPTION CYCLE DURATION BY A RESYNCHRONIZATION AMOUNT
1302

1400

RECEIVING ONE MORE RESYNCHRONIZATION COMMANDS FROM THE NETWORK ENTITY
1401

DETERMINING WHETHER TO MODIFY THE ONE OR MORE DRX PARAMETERS OF A CURRENT DISCONTINOUS RECEPTION CYCLE DURATION BY A RESYNCHRONIZATION AMOUNT BASED AT LEAST IN PART ON THE ONE OR MORE RESYNCHRONIZATION PARAMETERS
1402

FIG. 14

METHOD AND APPARATUS FOR ADAPTIVE DISCONTINOUS RECEPTION CONFIGURATION

TECHNOLOGICAL FIELD

An example embodiment relates generally to wireless communications and, more particularly, but not exclusively, to adaptive discontinuous reception configurations within such systems.

BACKGROUND

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

Data streams, such as extended reality (XR) data streams, may be provided over such communication networks. The corresponding data traffic of such data streams may be associated with quasi-periodic and multimodal bursty patterns. Such traffic periodicity may be due to, for example, a three-dimensional video generation process that creates a sequence of frames at a given sampling rate. Compression of the generated frames may be achieved through a mix of intra-frame and inter-frame coding. Intra-frame coding may use lossy coding techniques that require only the information carried in the compressed frame for decoding. In contrast, inter-frame coding applies differential techniques across multiple frames to encode and transmits only the differences across consecutive frames.

Frames generated using intra-frame coding are termed I-frames while frames generated using inter-frame coding are termed P-frames or B-frames, depending on the differential technique used. Inter-frame coding allows for higher compression at the cost of creating dependencies across frames. To limit the long dependencies and increase reliability against transmission losses, frames are organized into a Group of Pictures (GoP). A GoP may comprise a sequence of consecutive frames, typically starting with an I frame and followed by a certain number of P frames or B frames. Such GoP organization creates a bursty traffic pattern with a large burst due to the I frames followed by smaller bursts carrying P-frames and/or B-frames.

BRIEF SUMMARY

A method, apparatus, and computer program product are disclosed for determining a discontinuous reception configuration for a user equipment and configuring one or more discontinuous reception parameters. In this regard, the method, apparatus and computer program product are also configured to determine one or more adaptive parameters for the user equipment such that a discontinuous reception configuration may be modified. An indication of the next data burst to be provided to a user equipment may be provided to the user equipment in advance such that the user equipment may select determine whether to modify one or more discontinuous reception parameters.

In an example embodiment, a method is provided that includes receiving a data stream comprising one or more data bursts. In some embodiments, the one or more data bursts comprise two or more data burst classes and a data burst class is identified based at least in part on the size of the received data comprising the data burst. The method also includes determining one or more values for one or more discontinuous reception parameters and one or more values for one or more adaptive parameters. The one or more adaptive parameters are indicative of a modification value by which to modify the one or more discontinuous reception parameters. The method may further include causing a discontinuous reception configuration to be provided to a user equipment. The discontinuous reception configuration comprises the one or more values for the one or more discontinuous reception parameters and an indication of whether to apply the one or more adaptive parameters. The one or more discontinuous reception parameters are indicative of a discontinuous reception configuration for a particular data burst class. The method further comprises causing one or more selection commands to be provided to the user equipment. Each selection command comprises an indication of whether to apply the one or more adaptive parameters for a next data burst to be transmitted. The method further includes causing the one or more data bursts to be provided to the user equipment.

In some embodiments, the data stream comprises an extended reality stream. The extended reality stream comprises a group of pictures and the group of pictures comprises one or more data frames. A data frame can be identified based at least in part on the size.

In some embodiments, the discontinuous reception configuration further comprises the one or more adaptive parameters. In some embodiments, the indication whether to apply the one or more adaptive parameters is indicated by a discontinuous reception configuration index.

In some embodiments, the indication whether to apply the one or more adaptive parameters is indicated by one or more multiplier values. The one or more multiplier values are indicative of one or more values by which to multiply one or more discontinuous adaptive parameters.

In some embodiments, the method further includes, in an instance the data stream comprises a fixed pattern of data burst classes such that the pattern of data burst classes is known, causing an indication of the data burst class pattern to be provided to the user equipment.

In some embodiments, the one or more values for the one or more discontinuous reception parameters are indicative of at least a discontinuous reception cycle. In some embodiments, the discontinuous reception cycle may comprise an active period during which a control channel is monitored and a sleeping period during which the control channel is not monitored.

In some embodiments, the method further includes causing one or more resynchronization parameters to be provided to the user equipment. In some embodiments, the method further includes causing a resynchronization command to be provided to the user equipment. In some embodiments, the resynchronization command is included in one or more selection commands and causes one or more discontinuous reception parameters of a current discontinuous reception cycle to be modified by a resynchronization amount.

In some embodiments, the resynchronization amount is determined based at least in part on the difference between a duration of the discontinuous reception cycle and a data stream periodicity.

In some embodiments, the discontinuous reception configuration is provided using a radio resource control message and the selection command is embedded in a media access control service data unit.

In an example embodiment, an apparatus is provided including at least one processor and at least one memory including computer program code with the at least one memory and the computer program code configured to, with the at least one processor, cause the apparatus at least to receive a data stream comprising one or more data bursts. In some embodiments, the one or more data bursts comprise two or more data burst classes and a data burst class is identified based at least in part on the size of the received data comprising the data burst. The apparatus is further configured to determine one or more values for one or more discontinuous reception parameters and one or more values for one or more adaptive parameters. The one or more adaptive parameters are indicative of a modification value by which to modify the one or more discontinuous reception parameters. The apparatus is further configured to cause a discontinuous reception configuration to be provided to a user equipment. The discontinuous reception configuration comprises the one or more values for the one or more discontinuous reception parameters and an indication of whether to apply the one or more adaptive parameters. The one or more discontinuous reception parameters are indicative of a discontinuous reception configuration for a particular data burst class. The apparatus is further configured to cause one or more selection commands to be provided to the user equipment. Each selection command comprises an indication of whether to apply the one or more adaptive parameters for a next data burst to be transmitted. The apparatus is further configured to cause the one or more data bursts to be provided to the user equipment.

In some embodiments, the data stream comprises an extended reality stream. The extended reality stream comprises a group of pictures and the group of pictures comprises one or more data frames. A data frame can be identified based at least in part on the size.

In some embodiments, the discontinuous reception configuration further comprises the one or more adaptive parameters. In some embodiments, the indication whether to apply the one or more adaptive parameters is indicated by a discontinuous reception configuration index.

In some embodiments, the indication whether to apply the one or more adaptive parameters is indicated by one or more multiplier values. The one or more multiplier values are indicative of one or more values by which to multiply one or more discontinuous adaptive parameters.

In some embodiments, the apparatus is further configured to, in an instance the data stream comprises a fixed pattern of data burst classes such that the pattern of data burst classes is known, cause an indication of the data burst class pattern to be provided to the user equipment.

In some embodiments, the one or more values for the one or more discontinuous reception parameters are indicative of at least a discontinuous reception cycle. In some embodiments, the discontinuous reception cycle may comprise an active period during which a control channel is monitored and a sleeping period during which the control channel is not monitored.

In some embodiments, the apparatus is further configured to cause one or more resynchronization parameters to be provided to the user equipment. In some embodiments, the apparatus is further configured to cause a resynchronization command to be provided to the user equipment. In some embodiments, the resynchronization command is included in one or more selection commands and causes one or more discontinuous reception parameters of a current discontinuous reception cycle to be modified by a resynchronization amount.

In some embodiments, the resynchronization amount is determined based at least in part on the difference between a duration of the discontinuous reception cycle and a data stream periodicity.

In some embodiments, the discontinuous reception configuration is provided using a radio resource control message and the selection command is embedded in a media access control service data unit.

In another example embodiment, an apparatus is provided that includes means for receiving a data stream comprising one or more data bursts. In some embodiments, the one or more data bursts comprise two or more data burst classes and a data burst class is identified based at least in part on the size of the received data comprising the data burst. The apparatus also includes means for determining one or more values for one or more discontinuous reception parameters and one or more values for one or more adaptive parameters. The one or more adaptive parameters are indicative of a modification value by which to modify the one or more discontinuous reception parameters. The apparatus may further include means for causing a discontinuous reception configuration to be provided to a user equipment. The discontinuous reception configuration comprises the one or more values for the one or more discontinuous reception parameters and an indication of whether to apply the one or more adaptive parameters. The one or more discontinuous reception parameters are indicative of a discontinuous reception configuration for a particular data burst class. The apparatus further includes means for causing one or more selection commands to be provided to the user equipment. Each selection command comprises an indication of whether to apply the one or more adaptive parameters for a next data burst to be transmitted. The apparatus further includes means for causing the one or more data bursts to be provided to the user equipment.

In some embodiments, the data stream comprises an extended reality stream. The extended reality stream comprises a group of pictures and the group of pictures comprises one or more data frames. A data frame can be identified based at least in part on the size. In some embodiments, the discontinuous reception configuration further comprises the one or more adaptive parameters. In some embodiments, the indication whether to apply the one or more adaptive parameters is indicated by a discontinuous reception configuration index. In some embodiments, the indication whether to apply the one or more adaptive parameters is indicated by one or more multiplier values. The one or more multiplier values are indicative of one or more values by which to multiply one or more discontinuous adaptive parameters.

In some embodiments, the apparatus further includes means, in an instance the data stream comprises a fixed pattern of data burst classes such that the pattern of data burst classes is known, for causing an indication of the data burst class pattern to be provided to the user equipment. In some embodiments, the one or more values for the one or more discontinuous reception parameters are indicative of at least a discontinuous reception cycle. In some embodiments, the discontinuous reception cycle may comprise an active period during which a control channel is monitored and a sleeping period during which the control channel is not monitored.

In some embodiments, the apparatus further includes means for causing one or more resynchronization parameters to be provided to the user equipment. In some embodiments, the apparatus further includes means for causing a resynchronization command to be provided to the user equipment. In some embodiments, the resynchronization command is included in one or more selection commands and causes one or more discontinuous reception parameters of a current discontinuous reception cycle to be modified by a resynchronization amount.

In some embodiments, the resynchronization amount is determined based at least in part on the difference between a duration of the discontinuous reception cycle and a data stream periodicity. In some embodiments, the discontinuous reception configuration is provided using a radio resource control message and the selection command is embedded in a media access control service data unit.

In an example embodiment, a computer program product is provided that includes at least one non-transitory computer-readable storage medium having computer executable program code instructions stored therein with the computer executable program code instructions including program code instructions configured, upon execution, to receive a data stream comprising one or more data bursts. In some embodiments, the one or more data bursts comprise two or more data burst classes and a data burst class is identified based at least in part on the size of the received data comprising the data burst. The computer program product is further configured to determine one or more values for one or more discontinuous reception parameters and one or more values for one or more adaptive parameters. The one or more adaptive parameters are indicative of a modification value by which to modify the one or more discontinuous reception parameters. The computer program product is further configured to cause a discontinuous reception configuration to be provided to a user equipment. The discontinuous reception configuration comprises the one or more values for the one or more discontinuous reception parameters and an indication of whether to apply the one or more adaptive parameters. The one or more discontinuous reception parameters are indicative of a discontinuous reception configuration for a particular data burst class. The computer program product is further configured to cause one or more selection commands to be provided to the user equipment. Each selection command comprises an indication of whether to apply the one or more adaptive parameters for a next data burst to be transmitted. The computer program product is further configured to cause the one or more data bursts to be provided to the user equipment.

In some embodiments, the data stream comprises an extended reality stream. The extended reality stream comprises a group of pictures and the group of pictures comprises one or more data frames. A data frame can be identified based at least in part on the size.

In some embodiments, the discontinuous reception configuration further comprises the one or more adaptive parameters. In some embodiments, the indication whether to apply the one or more adaptive parameters is indicated by a discontinuous reception configuration index.

In some embodiments, the indication whether to apply the one or more adaptive parameters is indicated by one or more multiplier values. The one or more multiplier values are indicative of one or more values by which to multiply one or more discontinuous adaptive parameters.

In some embodiments, the computer program product is further configured to, in an instance the data stream comprises a fixed pattern of data burst classes such that the pattern of data burst classes is known, cause an indication of the data burst class pattern to be provided to the user equipment.

In some embodiments, the one or more values for the one or more discontinuous reception parameters are indicative of at least a discontinuous reception cycle. In some embodiments, the discontinuous reception cycle may comprise an active period during which a control channel is monitored and a sleeping period during which the control channel is not monitored.

In some embodiments, the computer program product is further configured to cause one or more resynchronization parameters to be provided to the user equipment. In some embodiments, the computer program product is further configured to cause a resynchronization command to be provided to the user equipment. In some embodiments, the resynchronization command is included in one or more selection commands and causes one or more discontinuous reception parameters of a current discontinuous reception cycle to be modified by a resynchronization amount.

In some embodiments, the resynchronization amount is determined based at least in part on the difference between a duration of the discontinuous reception cycle and a data stream periodicity.

In some embodiments, the discontinuous reception configuration is provided using a radio resource control message and the selection command is embedded in a media access control service data unit.

In an example embodiment, a method is provided that includes receiving a discontinuous reception configuration from a network entity. In some embodiments, the discontinuous reception configuration comprises one or more values for one or more discontinuous reception parameters and an indication of a particular data burst class to be transmitted. In some embodiments, the one or more discontinuous reception parameters are indicative of a discontinuous reception configuration for a particular data burst class. The method further includes selecting one or more discontinuous reception parameters to modify based at least in part on the received indication of a particular data burst class to be transmitted. The method further includes receiving one or more selection commands from the network entity. In some embodiments, the selection command comprises an indication of the next data burst class to be transmitted. The method further includes selecting one or more discontinuous reception parameters to modify based at least in part on the received indication of whether to apply the one or more adaptive parameters after the transmission of a current data burst is complete. The method further includes receiving one or more data bursts from the network entity.

In some embodiments, the discontinuous reception configuration further comprises the one or more adaptive parameters. In some embodiments, the indication of the next data burst class to be transmitted is indicated by a discontinuous reception configuration index. In some embodiments, the discontinuous reception configuration index is indicative of whether to apply one or more adaptive parameters to the one or more discontinuous reception parameters.

In some embodiments, the indication of the next data burst class to be transmitted is indicated by one or more multiplier values, and the one or more multiplier values are indicative of one or more values by which to multiply one or more discontinuous adaptive parameters.

In some embodiments, the method further includes, in an instance the data stream comprises a fixed pattern of data burst classes such that the sequence is known by the network entity, receiving an indication of the data burst class pattern. The method may further include selecting a discontinuous reception configuration pattern automatically based at least in part on the next anticipated data burst class in the data burst class pattern.

In some embodiments, the one or more values for the one or more discontinuous reception parameters are indicative of at least a discontinuous reception cycle. In some embodiments, a discontinuous reception cycle comprises an active period and a sleeping period. In some embodiments, the method further includes monitoring a control channel during the active period. In some embodiments, the method further includes causing corresponding circuitry to turn off during the sleeping period.

In some embodiments, the method further includes receiving one or more resynchronization parameters from the network entity. In some embodiments, the method further includes determining to modify one or more discontinuous reception parameters of a current discontinuous reception cycle by a resynchronization amount based at least in part on the one or more resynchronization parameters.

In some embodiments, the method further includes receiving a resynchronization command from the network entity. In some embodiments, the resynchronization command is included in one or more selection commands. In some embodiments, the method further includes modifying one or more discontinuous reception parameters of a current discontinuous reception cycle by a resynchronization amount.

In some embodiments, the resynchronization amount is determined based at least in part on the difference between a duration of the discontinuous reception cycle and a data stream periodicity.

In some embodiments, the adaptive discontinuous reception configuration is received using a radio resource control message and the selection command is embedded in a media access control service data unit.

In an example embodiment, an apparatus is provided including at least one processor and at least one memory including computer program code with the at least one memory and the computer program code configured to, with the at least one processor, cause the apparatus at least to receive a discontinuous reception configuration from a network entity. In some embodiments, the discontinuous reception configuration comprises one or more values for one or more discontinuous reception parameters and an indication of a particular data burst class to be transmitted. In some embodiments, the one or more discontinuous receptions parameters are indicative of a discontinuous reception configuration for a particular data burst class. The apparatus may further be configured to select one or more discontinuous reception parameters to modify based at least in part on the received indication of a particular data burst class to be transmitted. The apparatus may further be configured to receive one or more selection commands from the network entity. In some embodiments, the selection command comprises an indication of the next data burst class to be transmitted. The apparatus may further be configured to select one or more discontinuous reception parameters to modify based at least in part on the received indication of whether to apply the one or more adaptive parameters after the transmission of a current data burst is complete. The apparatus may further be configured to receive one or more data bursts from the network entity.

In some embodiments, the discontinuous reception configuration further comprises the one or more adaptive parameters. In some embodiments, the indication of the next data burst class to be transmitted is indicated by a discontinuous reception configuration index. In some embodiments, the discontinuous reception configuration index is indicative of whether to apply one or more adaptive parameters to the one or more discontinuous reception parameters.

In some embodiments, the indication of the next data burst class to be transmitted is indicated by one or more multiplier values, and the one or more multiplier values are indicative of one or more values by which to multiply one or more discontinuous adaptive parameters.

In some embodiments, the apparatus may further be configured to, in an instance the data stream comprises a fixed pattern of data burst classes such that the sequence is known by the network entity, receive an indication of the data burst class pattern. The apparatus may further be configured to select a discontinuous reception configuration pattern automatically based at least in part on the next anticipated data burst class in the data burst class pattern.

In some embodiments, the one or more values for the one or more discontinuous reception parameters are indicative of at least a discontinuous reception cycle. In some embodiments, a discontinuous reception cycle comprises an active period and a sleeping period. In some embodiments, the apparatus may further be configured to monitor a control channel during the active period. In some embodiments, the apparatus may further be configured to cause corresponding circuitry to turn off during the sleeping period.

In some embodiments, the apparatus may further be configured to receive one or more resynchronization parameters from the network entity. In some embodiments, the apparatus may further be configured to determine to modify one or more discontinuous reception parameters of a current discontinuous reception cycle by a resynchronization amount based at least in part on the one or more resynchronization parameters.

In some embodiments, the apparatus may further be configured to receive a resynchronization command from the network entity. In some embodiments, the resynchronization command is included in one or more selection commands. In some embodiments, the apparatus may further be configured to modify one or more discontinuous reception parameters of a current discontinuous reception cycle by a resynchronization amount.

In some embodiments, the resynchronization amount is determined based at least in part on the difference between a duration of the discontinuous reception cycle and a data stream periodicity.

In some embodiments, the adaptive discontinuous reception configuration is received using a radio resource control message and the selection command is embedded in a media access control service data unit.

In another example embodiment, an apparatus is provided that includes means for receiving a discontinuous reception configuration from a network entity. In some embodiments, the discontinuous reception configuration comprises one or more values for one or more discontinuous reception parameters and an indication of a particular data burst class to be transmitted. In some embodiments, the one or more discontinuous reception parameters are indicative of a discontinuous reception configuration for a particular data burst class. The apparatus further includes means for selecting one or more discontinuous reception parameters to modify based at least in part on the received indication of a particular data burst class to be transmitted. The apparatus further includes means for receiving one or more selection commands from the network entity. In some embodiments, the selection command comprises an indication of the next data burst class to be transmitted. The apparatus further includes means for selecting one or more discontinuous reception parameters to modify based at least in part on the received indication of whether to apply the one or more adaptive parameters after the transmission of a current data burst is complete. The apparatus further includes means for receiving one or more data bursts from the network entity.

In some embodiments, the discontinuous reception configuration further comprises the one or more adaptive parameters. In some embodiments, the indication of the next data burst class to be transmitted is indicated by a discontinuous reception configuration index. In some embodiments, the discontinuous reception configuration index is indicative of whether to apply one or more adaptive parameters to the one or more discontinuous reception parameters. In some embodiments, the indication of the next data burst class to be transmitted is indicated by one or more multiplier values, and the one or more multiplier values are indicative of one or more values by which to multiply one or more discontinuous adaptive parameters.

In some embodiments, the apparatus further includes means, in an instance the data stream comprises a fixed pattern of data burst classes such that the sequence is known by the network entity, for receiving an indication of the data burst class pattern. The apparatus may further include means for selecting a discontinuous reception configuration pattern automatically based at least in part on the next anticipated data burst class in the data burst class pattern.

In some embodiments, the one or more values for the one or more discontinuous reception parameters are indicative of at least a discontinuous reception cycle. In some embodiments, a discontinuous reception cycle comprises an active period and a sleeping period. In some embodiments, the method further includes monitoring a control channel during the active period. In some embodiments, the apparatus further includes means for causing corresponding circuitry to turn off during the sleeping period.

In some embodiments, the apparatus further includes means for receiving one or more resynchronization parameters from the network entity. In some embodiments, the apparatus further includes means for determining to modify one or more discontinuous reception parameters of a current discontinuous reception cycle by a resynchronization amount based at least in part on the one or more resynchronization parameters.

In some embodiments, the apparatus further includes means for receiving a resynchronization command from the network entity. In some embodiments, the resynchronization command is included in one or more selection commands. In some embodiments, the apparatus further includes means for modifying one or more discontinuous reception parameters of a current discontinuous reception cycle by a resynchronization amount.

In some embodiments, the resynchronization amount is determined based at least in part on the difference between a duration of the discontinuous reception cycle and a data stream periodicity. In some embodiments, the adaptive discontinuous reception configuration is received using a radio resource control message and the selection command is embedded in a media access control service data unit.

In an example embodiment, a computer program product is provided that includes at least one non-transitory computer-readable storage medium having computer executable program code instructions stored therein with the computer executable program code instructions including program code instructions configured, upon execution, to receive a discontinuous reception configuration from a network entity. In some embodiments, the discontinuous reception configuration comprises one or more values for one or more discontinuous reception parameters and an indication of a particular data burst class to be transmitted. In some embodiments, the one or more discontinuous reception parameters are indicative of a discontinuous reception configuration for a particular data burst class. The computer program product is further configured to select one or more discontinuous reception parameters to modify based at least in part on the received indication of a particular data burst class to be transmitted. The computer program product is further configured to receive one or more selection commands from the network entity. In some embodiments, the selection command comprises an indication of the next data burst class to be transmitted. The computer program product is further configured to select one or more discontinuous reception parameters to modify based at least in part on the received indication of whether to apply the one or more adaptive parameters after the transmission of a current data burst is complete. The computer program product is further configured to receive one or more data bursts from the network entity.

In some embodiments, the discontinuous reception configuration further comprises the one or more adaptive parameters. In some embodiments, the indication of the next data burst class to be transmitted is indicated by a discontinuous reception configuration index. In some embodiments, the discontinuous reception configuration index is indicative of whether to apply one or more adaptive parameters to the one or more discontinuous reception parameters.

In some embodiments, the indication of the next data burst class to be transmitted is indicated by one or more multiplier values, and the one or more multiplier values are indicative of one or more values by which to multiply one or more discontinuous adaptive parameters.

In some embodiments, the computer program product is further configured to, in an instance the data stream comprises a fixed pattern of data burst classes such that the sequence is known by the network entity, receive an indication of the data burst class pattern. The computer program product is further configured to select a discontinuous reception configuration pattern automatically based at least in part on the next anticipated data burst class in the data burst class pattern.

In some embodiments, the one or more values for the one or more discontinuous reception parameters are indicative of at least a discontinuous reception cycle. In some embodiments, a discontinuous reception cycle comprises an active period and a sleeping period. In some embodiments, the computer program product is further configured to monitor a control channel during the active period. In some embodiments, the computer program product is further configured to cause corresponding circuitry to turn off during the sleeping period.

In some embodiments, the computer program product is further configured to receive one or more resynchronization parameters from the network entity. In some embodiments, the computer program product is further configured to determine to modify one or more discontinuous reception parameters of a current discontinuous reception cycle by a resynchronization amount based at least in part on the one or more resynchronization parameters.

In some embodiments, the computer program product is further configured to receive a resynchronization command from the network entity. In some embodiments, the resynchronization command is included in one or more selection commands. In some embodiments, the computer program product is further configured to modify one or more discontinuous reception parameters of a current discontinuous reception cycle by a resynchronization amount.

In some embodiments, the resynchronization amount is determined based at least in part on the difference between a duration of the discontinuous reception cycle and a data stream periodicity.

In some embodiments, the adaptive discontinuous reception configuration is received using a radio resource control message and the selection command is embedded in a media access control service data unit.

BRIEF DESCRIPTION OF THE DRAWINGS

Figure 1A:
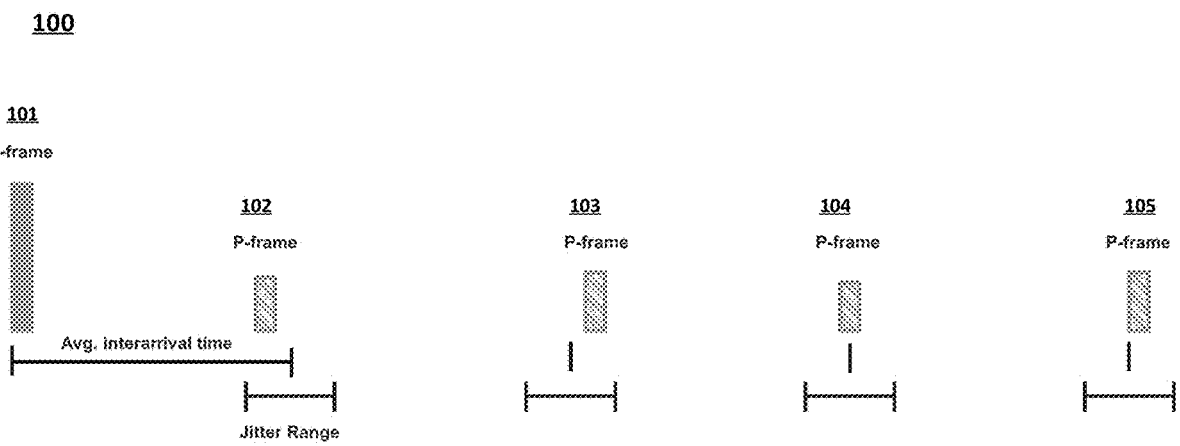
Figure 1B:
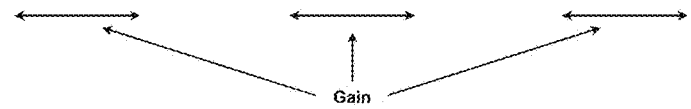
Figure 2:
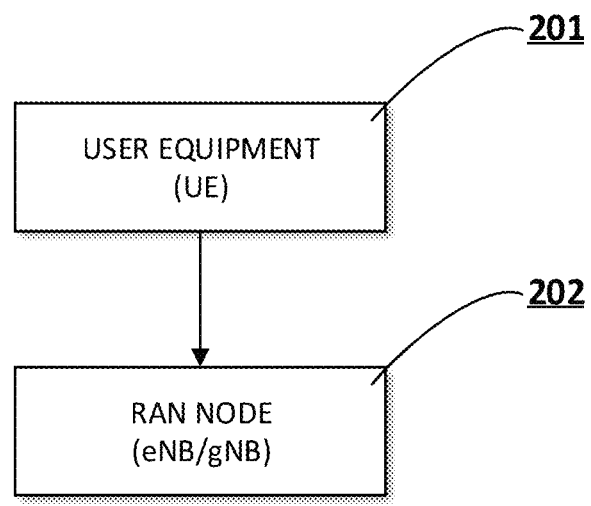
Figure 3:
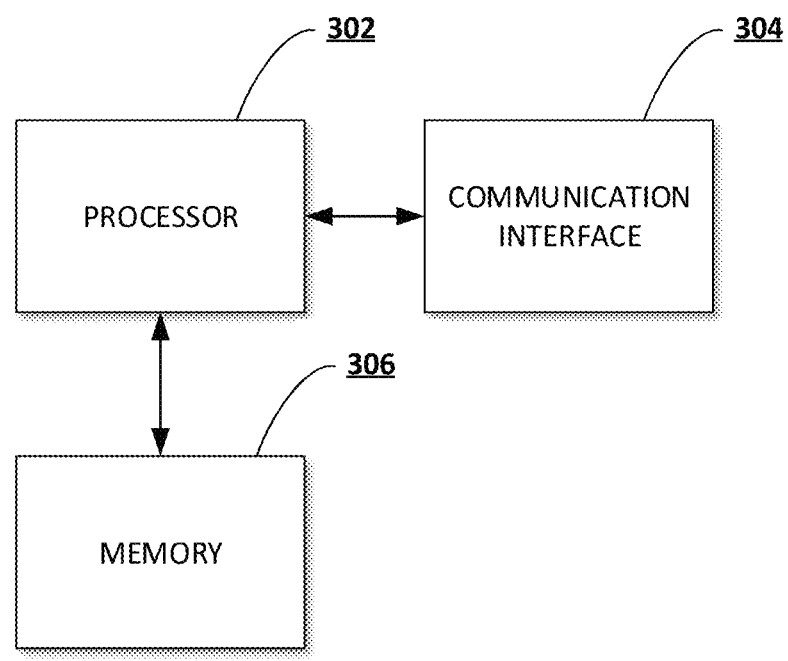
Figure 4:
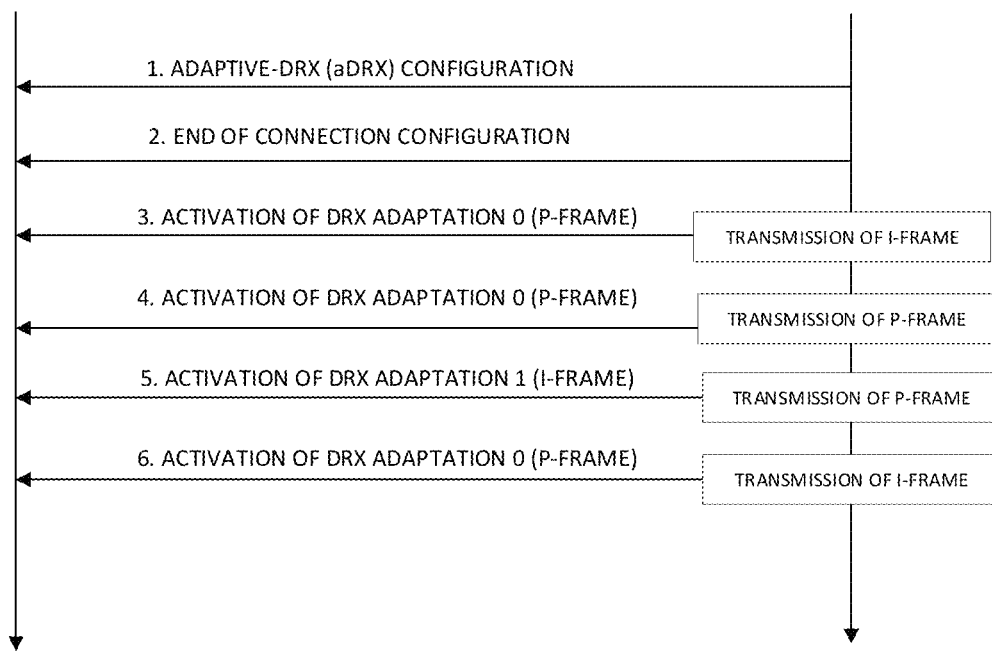
Figure 5:
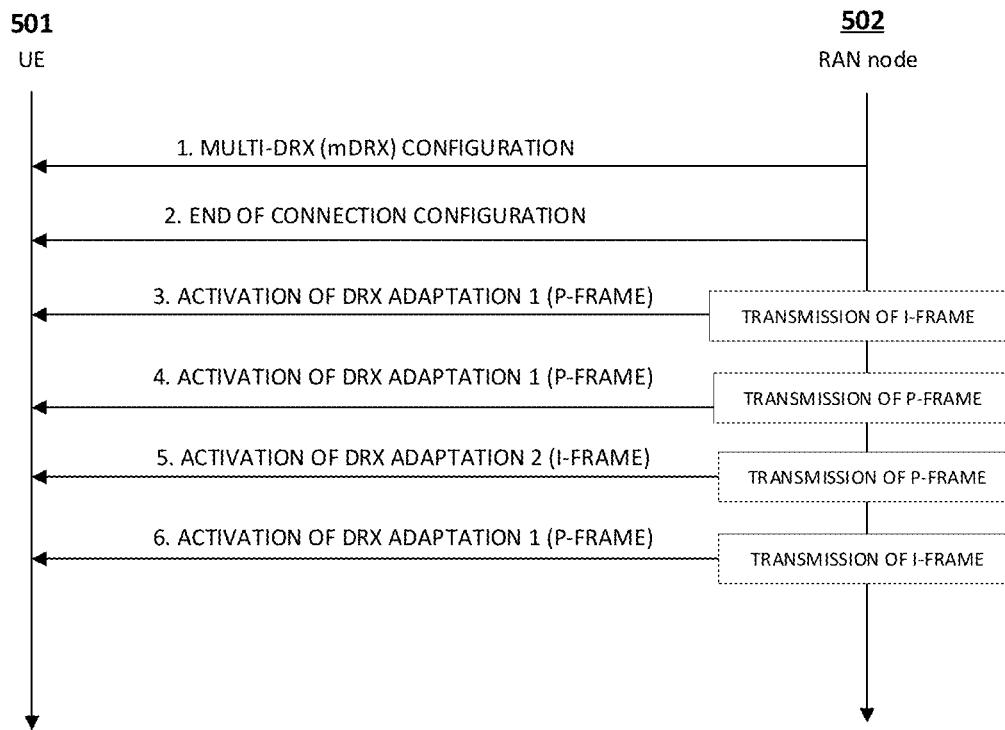
Figure 6:
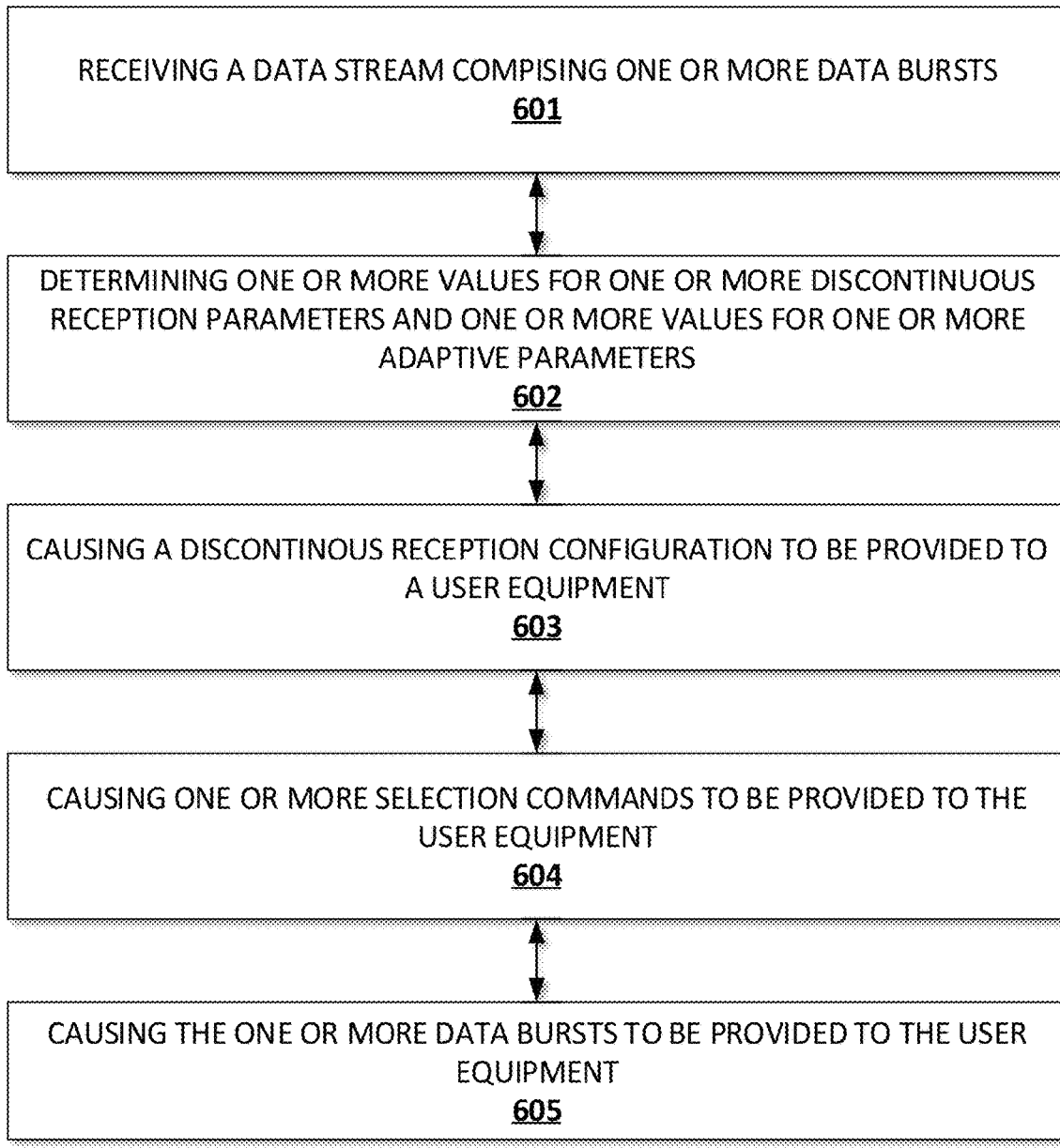
Figure 8:
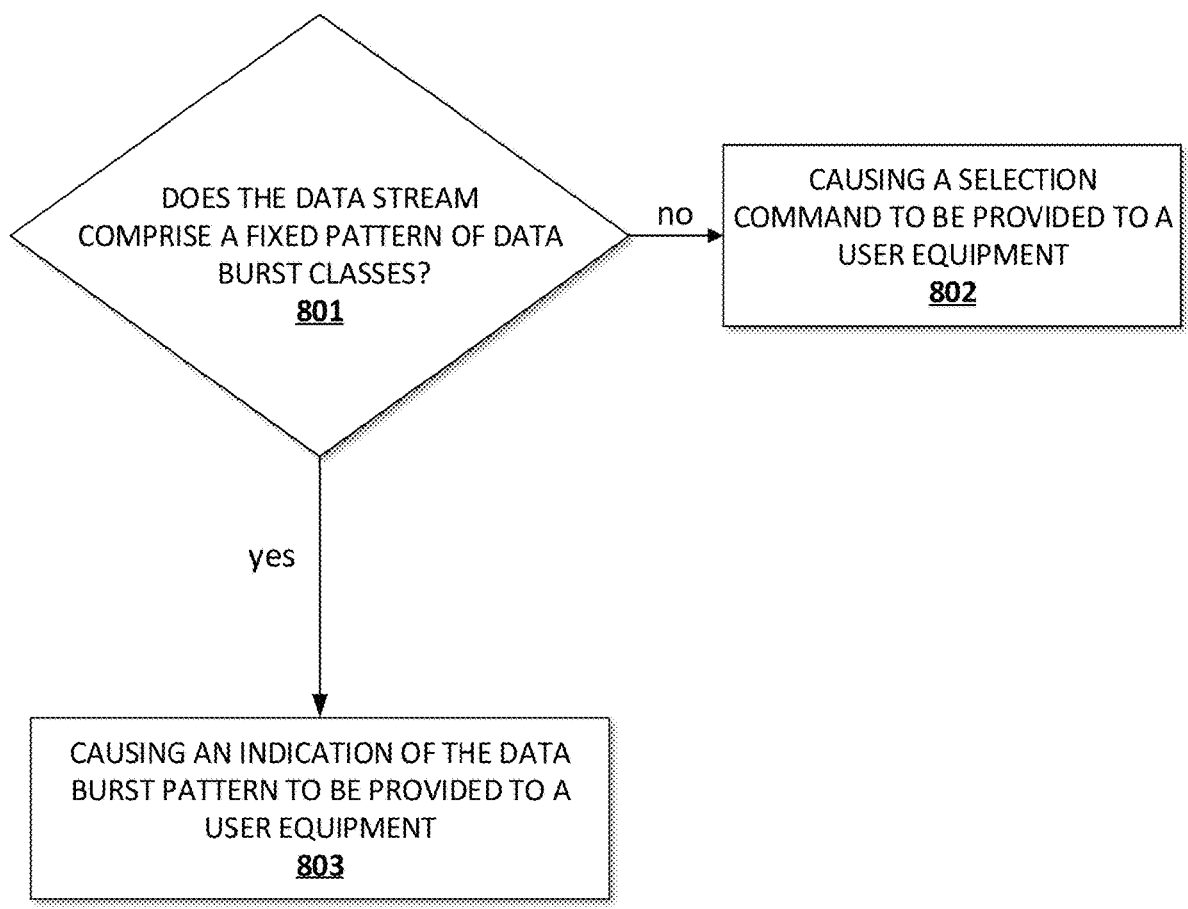
Figure 10:
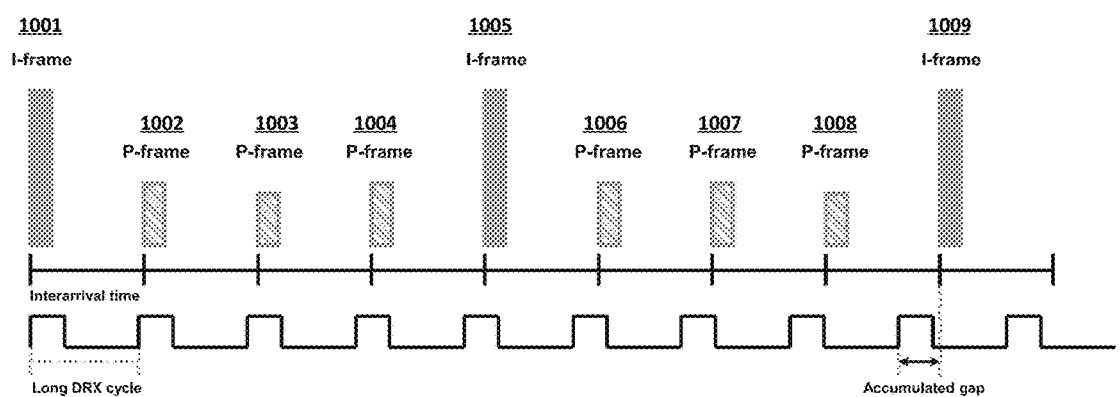
Figure 13:
Figure 15:
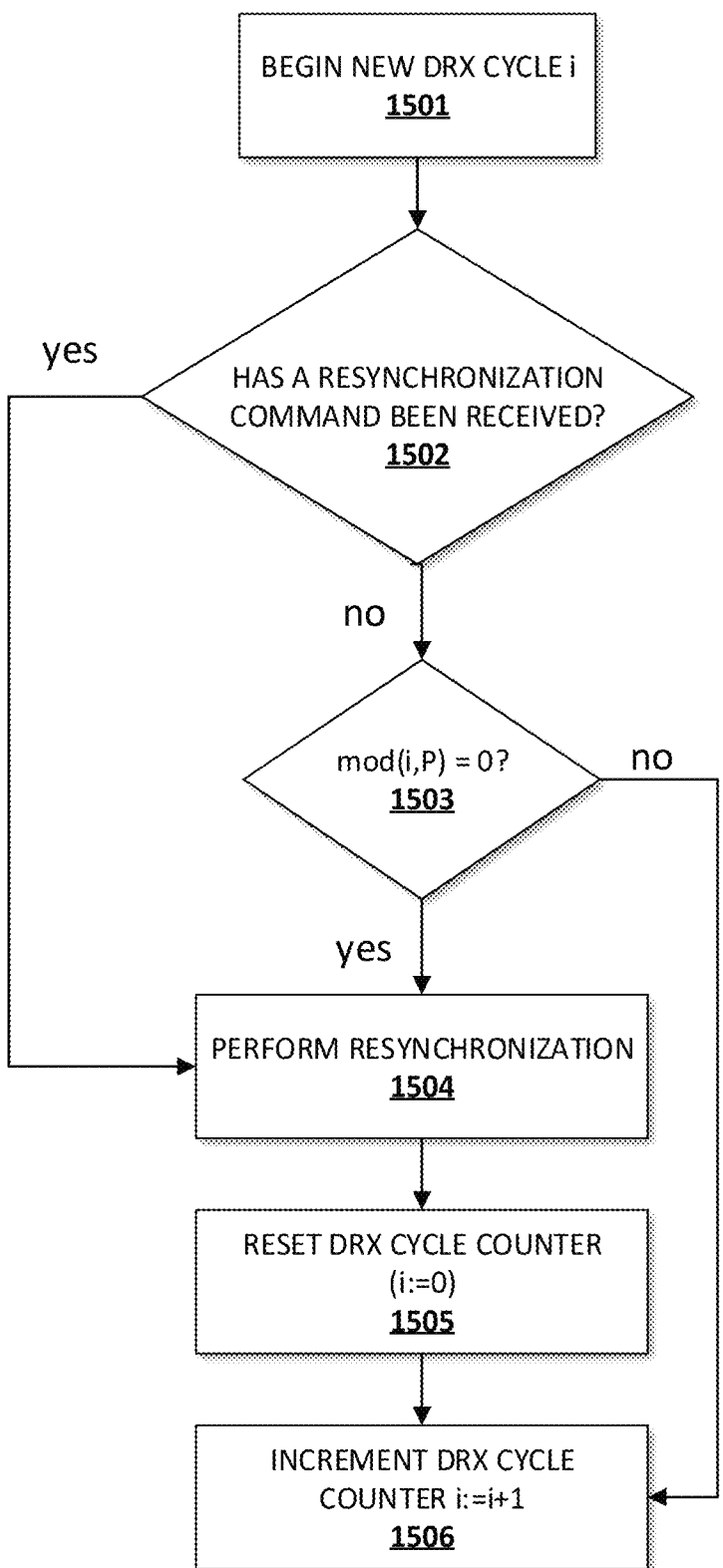

Having thus described certain example embodiments of the present disclosure in general terms, reference will hereinafter be made to the accompanying drawings, which are not necessarily drawn to scale, and wherein:

FIGS. 1A-B show an example data stream in a communication system of an illustrative embodiment;

FIG. 2 shows a communication system in an illustrative embodiment;

FIG. 3 is a block diagram of an apparatus that may be specifically configured in accordance with an example embodiment of the present disclosure;

FIG. 4 shows a message flow for adaptive discontinuous reception configuration in an illustrative embodiment;

FIG. 5 shows a message flow for multiplier discontinuous reception configuration in an illustrative embodiment;

FIG. 6 illustrates a flow diagram of an embodiment for causing one or more data bursts to be provided to a user equipment in an illustrative embodiment;

FIG. 7 illustrates a flow diagram of an embodiment for receiving one or more data bursts from a network entity in an illustrative embodiment;

FIG. 8 illustrates a logic flow for determining a data transmission to a user equipment when a data stream comprises a fixed pattern of burst classes in an illustrative embodiment;

FIG. 9 illustrates a flow diagram of an embodiment for receiving an indication of a burst class pattern from a network entity in an illustrative embodiment;

FIG. 10 shows an example data stream with an accumulated gap in a communication system in an illustrative embodiment;

FIG. 11 shows a message flow for adaptive discontinuous reception configuration with non-integer periodicity in an illustrative embodiment;

FIG. 12 illustrates a flow diagram of an embodiment for causing the transmission of a resynchronization command to a user equipment in an illustrative embodiment;

FIG. 13 illustrates a flow diagram of an embodiment for receiving a resynchronization command from a network entity in an illustrative embodiment;

FIG. 14 illustrates a flow diagram of an embodiment for receiving one or more resynchronization parameters from a network entity in an illustrative embodiment; and FIG. 15 illustrates a flow diagram of an embodiment for automatically performing a resynchronization in an illustrative embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As mentioned above, data streams may be associated with multimodal and bursty data traffic. Such data streams may therefore provide data using one or more data bursts. Each data burst may be associated with a data burst class, that may be identified based at least in part on the size of the data comprising the data burst. Such data streams typically comprise two or more data two or more data burst classes so as to be multimodal. In some scenarios, such as three-dimensional video generation, these data bursts may comprise one or more frames, such as I-frames, P-frames, and/or B-frames. Typically for three-dimensional video generation, only data bursts comprising I-frames and P-frames are considered to simplify decoding. In any case, these frames may be identified based at least in part on their associated data burst size. For example, data bursts containing over 100 kilobytes (kB) are typically I-frames, data bursts containing between 20-50 kB are typically P-frames, and data bursts containing between 2-10 kB are typically B-frames. These data frames may be organized into a GOP and may be transmitted to a user equipment (UE) for rendering, which may result in a bursty data traffic pattern, with large bursts caused by large data bursts classes (e.g. I-frames) and smaller data bursts caused by small data burst classes (e.g. P-frames and/or B-frames). As such, data streams of this sort may have somewhat predictable traffic patterns.

A UE configured to receive the data stream may benefit from this semi-predictable data stream traffic pattern such that it may perform power-saving techniques that may extend the UE battery life. To this end, discontinuous reception (DRX), first introduced in 3GPP release 7, is a basic technique that allows for configuration of a DRX cycle in the UE. In LTE and/or 5G communication networks, a DRX cycle comprises at least an active period (e.g. on-duration) during which the UE monitors a control channel, such as physical downlink control channel (PDCCH), and a sleeping period (e.g. off-duration) during which the UE may turn off corresponding circuitry to save power. If the UE does not receive an indication of a scheduled data transmission during an active period, the UE may enter a sleeping period and remain in the sleeping period until the end of the DRX cycle. Alternatively, if the UE receives an indication of a scheduled data transmission during an active period, the UE may remain in the active mode during a configurable period controlled by an inactivity timer that the UE (re)starts every time the UE receives a scheduled data transmission and only switches to sleeping mode once the timer expires. This process prevents the UE from entering a sleeping mode too soon, e.g., when there is still data to be transmitted and/or received.

The DRX cycle length may be adjusted to different traffic patterns of the UE. As such, the configuration of the two types of DRX cycles are defined in 3GPP TR 38.321 Section 5.7. The two types of DRX cycles include a long DRX and short DRX. If DRX is enabled, the long DRX is mandatory and is used in most scenarios. The short DRX is optional and mainly used for voice over internet protocol (VoIP) service. The DRX is configured for individual UE and uses a radio resource control (RRC) to choose the configuration that best suits the UE's traffic activity at a given time.

However, the current DRX configuration protocol only allows for a single configuration for a DRX cycle. As such, this may result in an inefficient configuration of the DRX cycle that does not fit the data stream traffic for a UE. More specifically, the UE active period and inactivity period may be based on large data bursts, such as data bursts due to I-frames. As such, smaller data bursts, such as data bursts due to P-frames and/or B-frames, which are typically smaller and more frequent than I-frame transmissions, would result in a loss in energy for the UE. Furthermore, the data stream may have a non-integer periodicity of data bursts due to how the data bursts are generated, for example, and thus the integer periodicity of DRX cycle configuration and the non-integer periodicity of the data stream may result in a lag between the active period of the DRX cycle and the data stream periodicity. This lag may accumulate over time and lead to desynchronization between the DRX cycle and the data stream periodicity. Such desynchronization may result in the loss of one or more data bursts since the packet delay budget (PDB) is typically smaller than the data stream traffic periodicity. Additionally, reconfiguration of the DRX cycle may be inefficient and time-consuming as such reconfiguration requires RRC signaling.

As such, it may be beneficial to pre-configure a UE with one or more DRX configurations. Pre-configuration of a UE with one or more DRX configurations allows the DRX cycle to be more easily controlled by indicating the most suitable DRX configuration for the next data burst comprising the data stream. Such signaling may be provided in various manners, such as by the use of a media access control control element (MAC CE) command to indicate to a UE when it should modify one or more of its currently configured DRX parameters by one or more adaptive parameters. This pre-configuration also is a more efficient option as compared to DRX reconfiguration as it uses, for example, a MAC CE command rather than an RRC configuration and/or reconfiguration messaging.

FIGS. 1A-B depict a representation of data stream 100 comprising one or more data bursts within which illustrative embodiments are to be implemented. However, it is to be appreciated that embodiments are not limited to the configurations illustrated herein or otherwise described below.

FIG. 1A depicts a representation of a data stream 100 comprising one or more data bursts 101-105. The one or more data bursts 101-105 comprise two or more data burst classes. In this example embodiment, the data stream 100 is an XR data stream comprising a GOP and the data burst classes are I-frames and P-frames. The GOP in this example embodiment comprises the frame sequence IPPPP, as depicted by data bursts 101-105. The data burst 101 corresponding to the I-frame is depicted larger than the data bursts 102-105 corresponding to the P-frames as the I-frame is a result of intra-frame coding that carries the compressed frame for decoding. The P-frames are a result of inter-frame coding that carries the differences across consecutive frames, and therefore result in a smaller data burst. Each data burst may be configured with a jitter range, which may be used as a tolerance value for network latency. Additionally, the interarrival time between two data bursts, such as data burst 101 and 102 may be the data stream periodicity. In some embodiments, the data stream periodicity (e.g. interarrival time) is the same or nearly the same between all data bursts comprising the data stream. In some embodiments, data stream periodicity is a non-integer periodicity such that the periodicity value is a non-integer value. Non-integer periodicity will be discussed in more detail with respect to FIG. 10.

FIG. 1B depicts the data stream 100 comprising the one or more data bursts 101-105 as received by a UE utilizing conventional DRX configurations 110 and 120 and as using DRX configurations of an example embodiment of the present disclosure. With conventional DRX configuration 110, the sum of an on period (the duration during which a UE monitors a control channel) and inactivity period (the duration before the UE switches to sleeping mode) must be set to cover the transmission associated with the largest data burst. In this particular example, this is the transmission data burst associated with an I-frame. As such, a UE may be configured with an on period to cover the transmission of a typical P-frame and the inactivity period to cover the transmission difference between a typical I-frame and P-frame. As shown by DRX configuration 110, this results in a short on period followed by a long inactivity time. Another conventional DRX configuration 120 may be configured with a longer on period than the inactivity period to better support more random patterns. The UE may then enter sleep mode before some of the data stream reaches a RAN node if the sum of the on and inactivity periods is lower than the largest burst. In such a case, the data comprising these data bursts might be lost or their transmission delayed by the RAN node. However, delayed data bursts increase the delivery time of the entire data burst (e.g., the entire I-frame is delayed) and potentially result in exceeding the PDB, which is measured for the entire burst. Therefore, even a single delayed data packet may result in the loss of the whole I-frame. This eventually results in the loss (or delay) of the following P-frames, since their decoding depends on the lost (or delayed) I-frame. In any case, DRX configurations 110 and 120 are inefficient from UE energy standpoint since I-frames are rarely compared to P-frames. From a pure energy perspective, it is better to configure the sum of on and inactivity periods equal to the P-frame transmission time even if the risk of losing/delaying some piece of the I-frame is increased.

To avoid choosing between energy efficiency and service availability, the DRX configuration 130 may dynamically change the DRX cycle for a DRX configuration. Here, the one or more DRX parameters of DRX configuration 130 may be tuned for data bursts, such as for I-frames and P-frames. The one or more DRX parameters may be modified, such as by adding and/or subtracting one or more adaptive DRX parameters or multiplying the one or more DRX parameters by one or more multiplier values. The adaptation of the DRX configuration may be pre-configured during an RRC connection configuration and indicated to the UE by a RAN node as a MAC CE command. By modulating the DRX configuration according to the next data burst, the RAN node can reduce or minimize the energy spent by the UE to monitor the PDCCH. For this particular example, it can be observed that for each P-frame the UE can increase the time spent in sleep mode, which eventually results in a large gain due to the high frequency of P-frames in the data stream 100.

In some embodiments, the one or more DRX parameters may comprise a drx-onDurationTimer (e.g., the duration at the beginning of the DRX cycle), a drx-SlotOffset (e.g., the delay before starting the drx-onDurationTimer), drx-InactivityTimer (e.g., the duration after the PDCCH occasion in which a PDCCH indicates a new uplink (UL) or downlink (DL) transmission for the MAC entity), drx-RetransmissionTimerDL (e.g., per DL hybrid automatic repeat request (HARQ) process except for the broadcast process, the maximum duration until a DL retransmission is received), drx-RetransmissionTimerUL (e.g., per UL HARQ process, the maximum duration until a grant for UL retransmission is received), drx-LongCycleStartOffset (e.g., the long DRX cycle and drx-StartOffset which defines the subframe where the long and short DRX cycle starts), drx-ShortCycle (e.g., the short DRX cycle), drx-ShortCycleTimer (e.g., the duration the UE shall follow the short DRX cycle), drx-HARQ-RTT-TimerDL (e.g., per DL HARQ process except for the broadcast process, the minimum duration before a DL assignment for HARQ retransmission is expected by the MAC entity), drx-HARQ-RTT-TimerUL (e.g., per UL HARQ process, the minimum duration before a UL HARQ retransmission grant is expected by the MAC entity), ps–Wakeup (e.g., the configuration to start associated drx-onDurationTimer in case DCP is monitored but not detected), ps-TransmitOtherPeriodicCSI (e.g., the configuration to report periodic channel state information (CSI) that is not level one reference signal received power (L1-RSRP) on physical uplink control channel (PUCCH) during the time duration indicated by drx-onDurationTimer in case DCP is configured but associated drx-onDurationTimer is not started), and/or ps-TransmitPeriodicL1-RSRP (e.g., the configuration to transmit periodic CSI that is L1-RSRP on PUCCH during the time duration indicated by drx-onDurationTimer in case DCP is configured but associated drx-onDurationTimer is not started).

In some embodiments, the one or more adaptive parameters may comprise a drx-onDurationTimerDelta(i) (e.g., the amount to add/subtract to drx-onDurationTimer), drx-SlotOffsetDelta (e.g., the amount to add/subtract to drx-SlotOffset), drx–InactivityTimerDelta(i) (e.g., the amount to add/subtract to drx-InactivityTimer), drx-RetransmissionTimerDLDelta(i) (e.g., per DL HARQ process except for the broadcast process, the amount to add/subtract to drx-RetransmissionTimerDL), drx-RetransmissionTimerULDelta(i) (e.g., per UL HARQ process, the amount to add/subtract to drx-RetransmissionTimerUL), drx-LongCycleStartOffsetDelta(i) (e.g., the amount to add/subtract to drx-LongCycleStartOffset), drx-ShortCycleDelta(i) (e.g., the amount to add/subtract to drx-ShortCycle), drx-ShortCycleTimerDelta(i) (e.g., the amount to add/subtract to drx-ShortCycleTimer), drx-HARQ-RTT-TimerDLDelta(i) (e.g., per DL HARQ process except for the broadcast process, the amount to add/subtract to drx-HARQ-RTT-TimerDL), drx-HARQ-RTT-TimerULDelta(i) (e.g., per UL HARQ process, the amount to add/subtract to drx-HARQ-RTT-TimerUL), ps-WakeupDelta(i) (e.g., the amount to add/subtract to ps–Wakeup), and/or ps-TransmitOtherPeriodicCSI-Delta(i) (e.g., the amount to add/subtract to ps-TransmitOtherPeriodicCSI) and ps-TransmitPeriodicL1-RSRP-Detla(i) (e.g., the amount to add/subtract to ps-TransmitPeriodicL1-RSRP).

FIG. 2 shows a communication system 200 within which certain illustrative embodiments are to be implemented. However, it is to be appreciated that embodiments are not limited to the network configurations illustrated herein or otherwise described below. It is to be understood that the elements shown in communication system 200 are intended to represent the main function provided within the system. As such, the blocks shown in FIG. 2 reference specific elements in LTE and/or 5G networks that provide the main functions. However, other network elements may be used to implement some or all of the main functions represented. Also, it is to be understood that not all functions of an LTE or 5G network are depicted in FIG. 2. Rather, functions that facilitate an explanation of illustrative embodiments are represented.

By way of example, the communication system 200 may be deployed within a radio access architecture. However, the system may be deployed in other applications including within other communication networks including, for example, long term evolution advanced (LTE Advanced, LTE-A), a universal mobile telecommunications system (UMTS) radio access network (UTRAN or E-UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Any access network eligible to access the 5G core network such as an Un-trusted Non 3GPP access terminated at a Non-3GPP interworking function (N3IWF), a trusted Non-3GPP access terminated at a trusted non-3GPP gateway function (TNGF) or a Wireline access terminated at a wireless access gateway function (W-AGF) may be used instead of the NG RAN/gNB.

In the radio access architecture of FIG. 2, user equipment 201 is configured to be in a wireless connection on one or more communication channels in a cell with an radio access network (RAN) node, such as an evolved Node B (eNB) or next generation Node B (gNB). The physical link from a user equipment 201 to an eNB or gNB is called the uplink or reverse link and the physical link from the eNB or gNB to the UE is called the downlink or forward link. It should be appreciated that the eNBs, gNBs, or their functionalities may be implemented by using any node, host, server, access point (AP), or other entity suitable for such a usage.

A communications system typically comprises more than one eNB or gNB, in which case the eNBs or gNBs may also be configured to communicate with one another over links, wired or wireless, designed for the purpose. These links may be used for signaling purposes. The eNB or gNB is a computing device configured to control the radio resources of the communication system to which the eNB or gNB is coupled. The eNB or gNB may also be referred to as a base station, an access point or any other type of interfacing device including a relay station capable of operating in a wireless environment. The eNB or gNB includes or is coupled to transceiver(s). From the transceivers of the eNB or gNB, a connection is provided to an antenna unit that establishes bi-directional radio links to UEs. As such, the transceivers of the eNB or gNB and the transceivers of the UEs may include transmitters and receivers configured to communicate via a channel.

Accordingly, as shown, communication system 200 comprises UE 201 that communicates, such as via an air interface, with an RAN node 202. The UE 201 may be a mobile station, and such a mobile station may comprise, by way of example, a mobile telephone, a computer, or any other type of communication device. In an LTE-V2X implementation, one or more UEs may deployed in a given vehicle. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., a vehicle). The user equipment 201 may also refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a UE may also be a nearly exclusive uplink only device, of which an example is a camera or video camera loading images or video clips to a network. A UE may also be a device having the capability to operate in an IoT network, which is a scenario in which objects are provided with the ability to transfer data over a network without requiring human-to-human or human-to-computer interaction. The user equipment (or in some embodiments a layer 3 relay node) is configured to perform one or more of user equipment functionalities. The user equipment may also be called a subscriber unit, mobile station, remote terminal, access terminal, user terminal or user device just to mention but a few apparatuses.

In one embodiment, UE 201 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The RAN node 202 is illustratively part of a RAN of the communication system 200. In an LTE network, the RAN node is typically implemented by an eNB while in a 5GS network, the RAN node is typically implemented by an gNB. Such an access network may comprise, for example, an LTE or 5GS (or mixed) having a plurality of base stations and one or more associated radio network control functions. The base stations and radio network control functions may be logically separate entities, but in a given embodiment may be implemented in the same physical network element, such as, for example, a base station router or femto cellular access point.

One example of an apparatus 300 that may be configured to function as a network entity, such as RAN node and more specifically, a gNB and/or an eNB, is depicted in FIG. 3. Additionally or alternatively, apparatus 300 of FIG. 3 may be configured to function as a user equipment. As shown in FIG. 3, the apparatus 300 includes, is associated with or is in communication with processor 302, a memory 306 and a communication interface 304. The processor 302 may be in communication with the memory device via a bus for passing information among components of the apparatus 300. The memory device 306 may be non-transitory and may include, for example, one or more volatile and/or non-volatile memories. In other words, for example, the memory device 306 may be an electronic storage device (e.g., a computer readable storage medium) comprising gates configured to store data (e.g., bits) that may be retrievable by a machine (e.g., a computing device like the processing circuitry). The memory device 306 may be configured to store information, data, content, applications, instructions, or the like for enabling the apparatus to carry out various functions in accordance with an example embodiment of the present disclosure. For example, the memory device 306 could be configured to buffer input data for processing by the processor 302. Additionally or alternatively, the memory device 306 could be configured to store instructions for execution by the processor 302.

The apparatus 300 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 302 may be embodied in a number of different ways. For example, the processor 302 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processor 302 may be configured to execute instructions stored in the memory device 306 or otherwise accessible to the processor 302. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processor 302 is embodied as an executor of instructions, the instructions may specifically configure the processor to perform the algorithms and/or operations described herein when the instructions are executed. However, in some cases, the processor 302 may be a processor of a specific device (e.g., an image or video processing system) configured to employ an embodiment of the present invention by further configuration of the processing circuitry by instructions for performing the algorithms and/or operations described herein. The processor 302 may include, among other things, a clock, an arithmetic logic unit (ALU) and logic gates configured to support operation of the processing circuitry.

The communication interface 304 may be any means such as a device or circuitry embodied in either hardware or a combination of hardware and software that is configured to receive and/or transmit data, including media content in the form of video or image files, one or more audio tracks or the like. In this regard, the communication interface 304 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 4 illustrates a procedure 400 to configure an adaptive DRX as well as one or more selection commands to dynamically change the DRX configuration. In operation 1 of FIG. 4, the RAN node 402 may cause an adaptive DRX configuration to be provided to UE 401. In some embodiments, the adaptive DRX configuration may comprise one or more DRX parameters. In some embodiments, the one or more DRX parameters are configured for the smallest data burst class in a data stream, such as a P-frame for data stream 100. By default, the UE will use the DRX configuration with the adaptation to fit the transmission of I-frame for data stream 100. This will keep the UE awake for longer time. However, the one or more DRX parameters may be configured for any data burst class. In example procedure 400, the one or more DRX parameters are configured for a P-frame.

In some embodiments, the adaptive DRX configuration further comprises one or more adaptive parameters. In some embodiments, the one or more adaptive parameters may be indicative of a modification value by which to modify the one or more DRX parameters. In some embodiments, the one or more adaptive parameters may be indicative of one or more values to add to and/or subtract from one or more DRX parameters. In some embodiments, the one or more adaptive parameters may be indicative of one or more values by which to multiply and/or divide one or more DRX parameters.

In some embodiments, the adaptive DRX configuration further comprises an indication of whether to apply the one or more adaptive parameters. The indication of whether to apply the one or more adaptive parameters may be based at least in part on the burst class for the first data burst to be transmitted to the UE 401. For example, if a data stream is an XR data stream comprising a GOP with a frame sequence comprising "IPPIPP", the first frame transmitted to UE 401 may be the I-frame. As such, since the one or more DRX parameters of UE 401 are configured for a P-frame, the indication of whether to apply the one or more adaptive parameters may be affirmative. The UE 401 may then apply the one or more adaptive parameters to the one or more DRX parameters such that the UE 401 may be configured for an I-frame. By default, the UE 401 may apply the one or more adaptive parameters to the one or more DRX parameters such that by default the UE 401 may be configured for an I-frame.

In some embodiments, the indication of whether to apply the one or more adaptive parameters may comprise a DRX configuration index indicative of whether to apply the one or more adaptive parameters to one or more DRX parameters. For example, an adaptive DRX configuration index value of 0 may indicate to UE 401 not apply the one or more adaptive parameters in an instance the data burst class to be transmitted (e.g. P-frame) is the same data burst class for which the one or more DRX parameters are configured (e.g. P-frame). As another example, an adaptive DRX configuration index value of 1 may indicate to UE 401 to apply the one or more adaptive parameters to one or more DRX parameters in an instance the data burst class to be transmitted (e.g. I-frame) is not the same data burst class for which the one or more DRX parameters are configured (e.g. P-frame). As such, the UE 401 may be configured for whichever data burst class comprises the first data burst of a data stream In operation 2 of FIG. 4, the RAN node 402 may end the connection configuration. In some embodiments, communication with the UE 401 in accordance with operations 1 and 2 of FIG. 4 may be provided using any of various messages, including an RRC message.

In operation 3 of FIG. 4, the RAN node 402 may cause a data burst of the data stream to be provided to the UE 401. In some embodiments, RAN node 402 may transmit the data burst on the physical downlink shared channel (PDSCH). In some embodiments, the data burst may be the first data burst of a sequence of data bursts comprising a data stream. By way of continuing example, the first frame in the frame sequence transmitted to UE 401 may be the I-frame. The UE 401 may be configured to receive the I-frame by applying by default the one or more adaptive parameters to one or more DRX parameters as described with respect to operation 1.

The RAN node 402 may also cause a selection command to be provided to UE 401. The selection command may comprise an indication of whether to apply the one or more adaptive parameters for a next data burst to be transmitted. By way of continuing example, the second frame in the frame sequence is a P-frame. Since the DRX parameters of the UE 401 are configured for a P-frame, the indication of whether to apply the one or more adaptive parameters may be negative. In some embodiments, the indication of whether to apply the one or more adaptive parameters may be indicated using a configuration index value, such as 0, indicative not to apply the one or more adaptive parameters. As such, no adaption will be applied to the next DRX cycle once the current frame transmission is complete.

In some embodiments, the selection command may be a new MAC CE command. In some embodiments, the selection command may be provided to the UE by embedding the selection command in a medium access control (MAC) service data unit (SDU). In some embodiments, if no selection command is transmitted by RAN node 402 to UE 401, the UE may continue to use the DRX configuration (with or without adaptation) from the previous DRX cycle.

In operation 4 of FIG. 4, the RAN node 402 may cause a data burst of the data stream to be provided to the UE 401.

In some embodiments, RAN node 402 may transmit the data burst on the physical downlink shared channel (PDSCH). In some embodiments, the data burst may be the second data burst of a sequence of data bursts comprising a data stream. By way of continuing example, the second frame in the frame sequence transmitted to UE 401 may be a P-frame. The UE 401 may be configured to receive the P-frame by not applying the one or more adaptive parameters to one or more DRX parameters as described with respect to operation 3.

The RAN node 402 may also cause a selection command to be provided to UE 401. Similarly as described in operation 3, the selection command may comprise an indication of whether to apply the one or more adaptive parameters for a next data burst to be transmitted. By way of continuing example, the next frame to be transmitted will be the third frame in the frame sequence, which is a P-frame. Again, since the DRX parameters of the UE 401 are configured for a P-frame, the indication of whether to apply the one or more adaptive parameters may be negative. In some embodiments, the indication of whether to apply the one or more adaptive parameters may be indicated using a configuration index value, such as 0, indicative not to apply the one or more adaptive parameters. In some embodiments, no selection command may be provided to UE 401 as the next frame is the same frame type for which the UE 401 is currently configured. Not providing the selection command to UE 401 may reduce network signaling and such that latency may reduced or minimized. As such, no adaption will be added to the next DRX cycle.

In operation 5 of FIG. 4, the RAN node 402 may cause a data burst of the data stream to be provided to the UE 401. In some embodiments, RAN node 402 may transmit the data burst on the physical downlink shared channel (PDSCH). In some embodiments, the data burst may be the third data burst of a sequence of data bursts comprising a data stream. By way of continuing example, the third frame in the frame sequence transmitted to UE 401 may be a P-frame. The UE 401 may be configured to receive the P-frame by not applying the one or more adaptive parameters to one or more DRX parameters as described with respect to operation 4.

The RAN node 402 may also cause a selection command to be provided to UE 401. Similarly as described in operations 3 and 4, the selection command may comprise an indication of whether to apply the one or more adaptive parameters for a next DRX cycle when the next data burst is expected to be transmitted. By way of continuing example, the next frame to be transmitted will be the fourth frame in the frame sequence, which is an I-frame. Since the DRX parameters of the UE 401 are configured for a P-frame, the indication of whether to apply the one or more adaptive parameters may be affirmative. In some embodiments, the indication of whether to apply the one or more adaptive parameters may be indicated using a configuration index value, such as 1, indicative to apply the one or more adaptive parameters. As such, one or more adaption parameters will be applied to one or more DRX parameters once the transmission of the current frame is complete. In some embodiments, the on duration of the DRX cycle may be increased to match the duration of the data burst generated by the I-frame.

In operation 6 of FIG. 4, the RAN node 402 may cause a data burst of the data stream to be provided to the UE 401. In some embodiments, RAN node 402 may transmit the data burst on the physical downlink shared channel (PDSCH). In some embodiments, the data burst may be the fourth data burst of a sequence of data bursts comprising a data stream. By way of continuing example, the fourth frame in the frame sequence transmitted to UE 401 may be an I-frame. The UE 401 may be configured to receive the I-frame by applying the one or more adaptive parameters to one or more DRX parameters as described with respect to operation 5.

The RAN node 402 may also cause a selection command to be provided to UE 401 and repeat the process as described above for the remainder of the frames comprising the GOP. Here, the selection command may comprise an indication of whether to apply the one or more adaptive parameters for a next data burst to be transmitted. By way of continuing example, the next frame to be transmitted will be the fifth frame in the frame sequence, which is a P-frame. Since the DRX parameters of the UE 401 are configured for a P-frame, the indication of whether to apply the one or more adaptive parameters may be negative.

FIG. 5 illustrates a procedure 500 to configure a multiplier DRX as well as one or more selection commands to dynamically change the DRX configuration. The multiplier DRX configuration may be substantially similar to the procedure described in FIG. 4 with the exception of how the indication of whether to apply the one or more adaptive parameters is provided to a UE 501.

In operation 1 of FIG. 5, the RAN node 502 may cause a multiplier DRX configuration to be provided to UE 401. In some embodiments, the multiplier DRX configuration may comprise one or more DRX parameters. In some embodiments, the one or more DRX parameters are configured for the smallest data burst class in a data stream, such as a P-frame for data stream 100. However, the one or more DRX parameters may be configured for any data burst class. In example procedure 500, the one or more DRX parameters are configured for a P-frame.

In some embodiments, the multiplier DRX configuration further comprises an indication of whether to apply the one or more adaptive parameters. The indication of whether to apply the one or more adaptive parameters may be based at least in part on the burst class for the first data burst to be transmitted to the UE 501. For example, if a data stream is an XR data stream comprising a GOP with a frame sequence comprising "IPPIPP", the first frame transmitted to UE 501 may be the I-frame. As such, since the one or more DRX parameters of UE 501 are configured for a P-frame, the indication of whether to apply the one or more adaptive parameters may be affirmative. The UE 501 may then apply the one or more adaptive parameters to the one or more DRX parameters such that the UE 501 may be configured for an I-frame.

In some embodiments, the indication of whether to apply the one or more adaptive parameters may comprises providing the UE 501 with one or more multiplier values by which to modify the one or more DRX parameters. The one or more multiplier values provided to the UE 501 may be indicative of one or more values by which to multiply one or more DRX parameter values.

In operation 2 of FIG. 5, the RAN node 502 may end the connection configuration. In some embodiments, the communication with the UE 501 in accordance with operations 1 and 2 of FIG. 5 may be provided via any of various messages including an RRC message.

In operation 3 of FIG. 5, the RAN node 502 may cause a data burst of the data stream to be provided to the UE 501. In some embodiments, RAN node 502 may transmit the data burst on the physical downlink shared channel (PDSCH). In some embodiments, the data burst may be the first data burst of a sequence of data bursts comprising a data stream. By way of continuing example, the first frame in the frame sequence transmitted to UE 501 may be the I-frame. The UE

501 may be configured to receive the I-frame by applying the one or more multiplier values (e.g., adaptive parameters) to one or more DRX parameters as described with respect to operation 1.

The RAN node 502 may also cause a selection command to be provided to UE 501. The selection command may comprise one or more multiplier values by which to multiply the one or more DRX parameters. By way of continuing example, the second frame in the frame sequence is a P-frame. Since the DRX parameters of the UE 501 are configured for a P-frame, the one or more multiplier values may be 1 such that the one or more DRX parameters are not modified. As such, no adaption will be applied once the current frame transmission is complete.

In some embodiments, the selection command may be a new MAC CE command. In some embodiments, the selection command may be provided to the UE by embedding the selection command in a MAC service data unit (SDU). In some embodiments, if no selection command is transmitted by RAN node 502 to UE 501, the UE may continue to use the DRX configuration (with or without adaptation) from the previous DRX cycle.

In operation 4 of FIG. 5, the RAN node 502 may cause a data burst of the data stream to be provided to the UE 501. In some embodiments, RAN node 502 may transmit the data burst on the physical downlink shared channel (PDSCH). In some embodiments, the data burst may be the second data burst of a sequence of data bursts comprising a data stream. By way of continuing example, the second frame in the frame sequence transmitted to UE 501 may be a P-frame. The UE 501 may be configured to receive the P-frame by applying one or more multiplier values of 1 such that the one or more DRX parameters are not modified as described with respect to operation 3.

The RAN node 502 may also cause a selection command to be provided to UE 501. Similarly as described in operation 3, the selection command may comprise one or more multiplier values by which to multiply the one or more DRX parameters. By way of continuing example, the next frame to be transmitted will be the third frame in the frame sequence, which is a P-frame. Since the DRX parameters of the UE 501 are configured for a P-frame, the one or more multiplier values may be 1 such that the one or more DRX parameters are not modified. As such, no adaption will be applied once the current frame transmission is complete.

In operation 5 of FIG. 5, the RAN node 502 may cause a data burst of the data stream to be provided to the UE 501. In some embodiments, RAN node 502 may transmit the data burst on the physical downlink shared channel (PDSCH). In some embodiments, the data burst may be the third data burst of a sequence of data bursts comprising a data stream. By way of continuing example, the third frame in the frame sequence transmitted to UE 501 may be a P-frame. The UE 501 may be configured to receive the P-frame by applying one or more multiplier values of 1 such that the one or more DRX parameters are not modified as described with respect to operation 4.

The RAN node 502 may also cause a selection command to be provided to UE 501. Similarly as described in operations 3 and 4, the selection command may comprise one or more multiplier values by which to multiply the one or more DRX parameters. By way of continuing example, the next frame to be transmitted will be the fourth frame in the frame sequence, which is an I-frame. Since the DRX parameters of the UE 501 are configured for a P-frame, the one or more multiplier values may be a value other than 1, such as 2, such that the one or more DRX parameters are modified by the one or more multiplier amounts. As such, the DRX parameters will be modified once the current frame transmission is complete. In some embodiments, the on duration of the DRX cycle may be increased to match the duration of the data burst generated by the I-frame.

In operation 6 of FIG. 5, the RAN node 502 may cause a data burst of the data stream to be provided to the UE 501. In some embodiments, RAN node 502 may transmit the data burst on the physical downlink shared channel (PDSCH). In some embodiments, the data burst may be the fourth data burst of a sequence of data bursts comprising a data stream. By way of continuing example, the fourth frame in the frame sequence transmitted to UE 501 may be an I-frame. The UE 501 may be configured to receive the I-frame by modifying the one or more DRX parameters using one or more multiplier values as described with respect to operation 5.

The RAN node 502 may also cause a selection command to be provided to UE 501 and repeat the process as described above for the remainder of the frames comprising the GOP. Here, the selection command may comprise one or more multiplier values by which to multiply the one or more DRX parameters. By way of continuing example, the next frame to be transmitted will be the fifth frame in the frame sequence, which is a P-frame. Since the DRX parameters of the UE 501 are configured for a P-frame, the one or more multiplier values may be 1 such that the one or more DRX parameters are not modified. As such, no adaption will be applied once the current frame transmission is complete.

Referring now to FIG. 6, an example flowchart 600 implemented, for example, by an apparatus 300 embodied by a network entity, such as RAN node 202, to cause a selection command and one or more data bursts to be provided to a UE will be discussed herein.

As shown in block 601, the apparatus 300 embodied by a network entity, such as RAN node 202, may include means, such as the processor 302, the communication interface 304 or the like, for receiving a data stream comprising one or more data bursts. In some embodiments, the one or more data bursts comprise two or more data burst classes. In some embodiments, a data burst class is identified based at least in part on the size of the received data comprising the data burst. In some embodiments, the data stream is an XR data stream comprising a GOP. In some embodiment, the GOP comprises one or more data frames.

As shown in block 602, the apparatus 300 embodied by a network entity, such as RAN node 202, may include means, such as the processor 302, or the like, for determining one or more values for one or more DRX parameters and one or more adaptive parameters. In some embodiments, the one or more adaptive parameters may be indicative of a modification value by which to modify the one or more DRX parameters. In some embodiments, the one or more adaptive parameters may be indicative of one or more values to add to and/or subtract from one or more DRX parameters. In some embodiments, the one or more adaptive parameters may be indicative of one or more values by which to multiply and/or divide one or more DRX parameters. The RAN node 202 may determine the one or more DRX parameters and/or the one or more adaptive parameters based at least in part on an associated UE's data traffic activity.

As shown in block 603, the apparatus 300 embodied by a network entity, such as RAN node 202, may include means, such as the processor 302, communication interface 304, or the like, for causing a DRX configuration to be provided to a UE, such as UE 201. In some embodiments, the DRX configuration comprises one or more values for the one or more DRX parameters.

In some embodiments, the one or more DRX parameters may be indicative of a DRX configuration for a particular data burst class. For example, if the data stream is an XR data stream comprising one or more frames, such as I-frames and P-frames, the one or more DRX parameters may be configured for a particular frame. In some embodiments, the one or more DRX parameters may be configured for an I-frame. In some embodiments, the one or more DRX parameters may be configured for a P-frame. In some embodiments, the one or more DRX parameters may include a duration the UE remains on, a duration the UE remains active, a duration the UE remains asleep, and/or the like.

In some embodiments, the DRX configuration comprises an indication of whether to apply the one or more adaptive parameters. In some embodiments, the indication of whether to apply the one or more adaptive parameters may comprise a DRX configuration index indicative of whether to apply the one or more adaptive parameters (e.g. add, subtract, divide, multiply, etc.) to one or more DRX parameters. For example, an adaptive DRX configuration index value of 0 may indicate to not to apply the one or more adaptive parameters in an instance the data burst class to be transmitted is the same data burst class for which the one or more DRX parameters are configured. As another example, an adaptive DRX configuration index value of 1 may indicate to apply the one or more adaptive parameters to one or more DRX parameters in an instance the data burst class to be transmitted is not the same data burst class for which the one or more DRX parameters are configured. In some embodiments, the indication of whether to apply the one or more adaptive parameters comprises one or more multiplier values by which to modify the one or more DRX parameters. As such, a UE may be dynamically configured to receive the transmitted data burst class.

As shown in block 604, the apparatus 300 embodied by a network entity, such as RAN node 202, may include means, such as the processor 302, communication interface 304, or the like, for causing one or more selection commands to be provided to the UE, such as UE 201. In some embodiments, the one or more selection commands may be provided to the UE by embedding the selection command in a MAC SDU.

In some embodiments, a selection command comprises an indication of whether to apply the one or more adaptive parameters. In some embodiments, the indication of whether to apply the one or more adaptive parameters may comprise a DRX configuration index indicative of whether to apply the one or more adaptive parameters (e.g. add, subtract, divide, multiply, etc.) to one or more DRX parameters. For example, an adaptive DRX configuration index value of 0 may indicate to not to apply the one or more adaptive parameters in an instance the data burst class to be transmitted is the same data burst class for which the one or more DRX parameters are configured. As another example, an adaptive DRX configuration index value of 1 may indicate to apply the one or more adaptive parameters to one or more DRX parameters in an instance the data burst class to be transmitted is not the same data burst class for which the one or more DRX parameters are configured. In some embodiments, the indication of whether to apply the one or more adaptive parameters comprises one or more multiplier values by which to modify the one or more DRX parameters y.

As shown in block 605, the apparatus 300 embodied by a network entity, such as RAN node 202, may include means, such as the processor 302, communication interface 304, or the like, for causing the one or more data bursts comprising the data stream to be provided to the UE, such as UE 201. In some embodiments, the data stream comprises a sequence of one or more data bursts. The RAN node 202 may provide the one or more data bursts based at least in part on the sequence of one or more data bursts. For example, a data stream may be an XR data stream comprising a GOP with the frame sequence "IPPIPP". As such, the RAN node may cause the frames comprising the GOP in order of the frame sequence, e.g., "IPPIPP". In some embodiments, causing a data burst to be provided to a UE may occur with a predefined temporal relationship to a selection command, such as simultaneously with a selection command as described in block 604. In some embodiments, the data burst may be provided simultaneously with the selection command corresponding to the data burst immediately following the transmitted data burst in the data burst sequence. In some embodiments, the data burst may be provided to the UE without the selection command.

In some embodiments, causing the data bursts to be provided to the UE may be associated with a data stream periodicity. In some embodiments, the data stream periodicity is the period, that is, the time duration, between two consecutively data bursts being provided to the UE. In some embodiments, the data stream periodicity is an integer periodicity such that the periodicity between each of the data bursts comprising the data stream is the same and/or within a predefined threshold amount. In some embodiments, the predefined threshold amount is a value and/or percentage. For example, the periodicity may have a predefined threshold of 5% such that the time durations between every two consecutive data bursts are within 5% of the average data burst such that the data stream is considered to have an integer periodicity. In other embodiments, the data stream periodicity has non-integer periodicity such that the periodicity between at least some of the consecutive data burst pairs is the different and/or exceeds a predefined threshold amount. For example, the periodicity may have a predefined threshold of 5% such that if one or more the time durations between two consecutive data bursts exceed 5% of the average data burst, the data stream is considered to have a non-integer periodicity.

Referring now to FIG. 7, an example flowchart 700 implemented, for example, by an apparatus 300 embodied by a UE, such as UE 201, to select one or more DRX parameters to modify will be discussed herein.

As shown in block 701, the apparatus 300 embodied by a UE, such as UE 201, may include means, such as the processor 302, communication interface 304, or the like for receiving a DRX configuration from a network entity, such as a RAN node 202. In some embodiments, the DRX configuration comprises one or more values for the one or more DRX parameters.

In some embodiments, the one or more DRX parameters may be indicative of a DRX configuration for a particular data burst class. For example, if the data stream is an XR data stream comprising one or more frames, such as I-frames and P-frames, the one or more DRX parameters may be configured for a particular frame. In some embodiments, the one or more DRX parameters may be configured for an I-frame. In some embodiments, the one or more DRX parameters may be configured for a P-frame. In some embodiments, the one or more DRX parameters may include a duration the UE remains on, a duration the UE remains active, a duration the UE is active, a duration the UE remains asleep, and/or the like.

In some embodiments, the DRX configuration comprises an indication of whether to apply the one or more adaptive parameters. In some embodiments, the indication of whether to apply the one or more adaptive parameters may comprises a DRX configuration index indicative of whether to apply the one or more adaptive parameters (e.g. add, subtract, divide, multiply, etc.) to one or more DRX parameters. For example, an adaptive DRX configuration index value of 0 may indicate to not apply the one or more adaptive parameters in an instance the data burst class to be transmitted is the same data burst class for which the one or more DRX parameters are configured. As another example, an adaptive DRX configuration index value of 1 may indicate to apply the one or more adaptive parameters to one or more DRX parameters in an instance the data burst class to be transmitted is not the same data burst class for which the one or more DRX parameters are configured. In some embodiments, the indication of whether to apply the one or more adaptive parameters comprises one or more multiplier values by which to modify the one or more DRX parameters. As such, the UE 201 may be dynamically configured to receive the transmitted data burst class.

As shown in block 702, the apparatus 300 embodied by a UE, such as UE 201, may include means, such as the processor 302, or the like, for selecting one or more DRX parameters to modify based at least in part on a received indication of whether to apply the one or more adaptive parameters. In some embodiments, the received indication of whether to apply the one or more adaptive parameters may comprise a DRX configuration index indicative of whether to apply the one or more adaptive parameters (e.g. add, subtract, divide, multiply, etc.) to one or more DRX parameters. The DRX configuration index may be indicative of which DRX parameters to modify as well as the operation to modify the one or more DRX parameters. For example, an adaptive DRX configuration index value of 0 may indicate to not apply the one or more adaptive parameters in an instance the data burst class to be transmitted is the same data burst class for which the one or more DRX parameters are configured. As such, the UE may select zero DRX configuration parameters to modify. As another example, an adaptive DRX configuration index value of 1 may indicate to apply the one or more adaptive parameters to one or more DRX parameters in an instance the data burst class to be transmitted is not the same data burst class for which the one or more DRX parameters are configured. As such, the UE may modify each value of the one or more DRX parameters by one or more values of the one or more adaptive parameters. As another example, a DRX parameter corresponding to ps-Wakeup may be defined by the equation:

$$ps\text{-Wakeup}=ps\text{-Wakeup}+ps\text{-Wakeup}(drx\text{-AdaptionIndex})$$

Here, the DRX parameter ps-Wakeup is modified by the adaptive parameter ps-Wakeup(drx-AdaptionIndex).

In some embodiments, the indication of whether to apply the one or more adaptive parameters comprises one or more multiplier values by which to modify the one or more DRX parameters. In some embodiments, the multiplier value may comprise a single value by which to multiply each of the one or more DRX parameters. In some embodiments, each of the one or more DRX parameters is rounded, such as to the lowest integer after modification by the multiplier value. In some embodiments, each of the DRX parameters are rounded to the highest integer after modification by the multiplier value. In some embodiments, each of the DRX parameters are rounded to the closest integer after modification by the multiplier value. For example, the multiplier value may be two such that each DRX parameter is multiplied by 2 and rounded down to the nearest integer value. In some embodiments, the multiplier value may comprise one or more multiplier values by which to multiply one or more corresponding DRX parameters. In some embodiments, each of the one or more DRX parameters is rounded to the lowest integer after modification by the one or more multiplier values. For example, the one or more multiplier values may be comprise a multiplier value of two corresponding to the DRX parameter ps-Wakeup and a multiplier value of three corresponding to a DRX parameter drx-InactivityTimerDelta may be defined by the equations:

$$ps\text{-Wakeup}=ps\text{-Wakeup}*2 \text{ and}$$

$$drx\text{-InactivityTimerDelta}=drx\text{-InactivityTimerDelta}*3$$

Here, the DRX parameters ps-Wakeup and drx-InactivityTimerDelta are modified by a multiplier amount.

As shown in block 703, the apparatus 300 embodied by a UE, such as UE 201, may include means, such as the processor 302, communication interface 304 or the like, for receiving one or more selection commands from a network entity, such as RAN node 202. In some embodiments, the one or more selection commands may be received by identifying a selection command embedded in a MAC SDU.

In some embodiments, as described with respect to block 702, the received indication of whether to apply the one or more adaptive parameters may comprise a DRX configuration index indicative of whether to apply the one or more adaptive parameters (e.g. add, subtract, divide, multiply, etc.) to one or more DRX parameters. The DRX configuration index may be indicative of which DRX parameters to modify as well as the operation to be utilized to modify the one or more DRX parameters. For example, an adaptive DRX configuration index value of 0 may indicate to not apply the one or more adaptive parameters in an instance the data burst class to be transmitted is the same data burst class for which the one or more DRX parameters are configured. As such, the UE may select zero DRX configuration parameters to modify. As another example, an adaptive DRX configuration index value of 1 may indicate to apply the one or more adaptive parameters to one or more DRX parameters in an instance the data burst class to be transmitted is not the same data burst class for which the one or more DRX parameters are configured.

In some embodiments, the indication of whether to apply the one or more adaptive parameters comprises one or more multiplier values by which to modify the one or more DRX parameters. In some embodiments, the multiplier value may comprise a single value by which to multiply each of the one or more DRX parameters. In some embodiments, each of the one or more DRX parameters is rounded to the lowest integer after modification by the multiplier value. In some embodiments, each of the DRX parameters are rounded to the highest integer after modification by the multiplier value. In some embodiments, each of the DRX parameters are rounded to the closest integer after modification by the multiplier value. For example, the multiplier value may be two such that each DRX parameter is multiplied by 2 and rounded down to the nearest integer value. In some embodiments, the multiplier value may comprise one or more multiplier values by which to multiply one or more corresponding DRX parameters. In some embodiments, each of the one or more DRX parameters is rounded to the lowest integer after modification by the one or more multiplier values.

As shown in block 704, the apparatus 300 embodied by a UE, such as UE 201, may include means, such as the processor 302, or the like, for selecting one or more DRX parameters to modify based at least in part on a received indication of whether to apply the one or more adaptive parameters after the transmission of the current data burst is complete. In some embodiments, the received indication of whether to apply the one or more adaptive parameters may comprise a DRX configuration index indicative of whether to apply the one or more adaptive parameters (e.g. add, subtract, divide, multiply, etc.) to one or more DRX parameters. The DRX configuration index may be indicative of which DRX parameters to modify as well as the operation to be utilized to modify the one or more DRX parameters. For example, an adaptive DRX configuration index value of 0 may indicate to not apply the one or more adaptive parameters in an instance the data burst class to be transmitted is the same data burst class for which the one or more DRX parameters are configured. As such, the UE may select zero DRX configuration parameters to modify. As another example, an adaptive DRX configuration index value of 1 may indicate to apply the one or more adaptive parameters to one or more DRX parameters in an instance the data burst class to be transmitted is not the same data burst class for which the one or more DRX parameters are configured. As such, the UE may modify each value of the one or more DRX parameters by one or more values of the one or more adaptive parameters. As another example, a DRX parameter corresponding to ps–Wakeup may be defined by the equation:

$$ps\text{--}Wakeup = ps\text{--}Wakeup + ps\text{--}Wakeup(drx\_\text{Adaption-Index})$$

Here, the DRX parameter ps–Wakeup is modified by the adaptive parameter ps–Wakeup(drx–AdaptionIndex).

In some embodiments, the indication of whether to apply the one or more adaptive parameters comprises one or more multiplier values by which to modify the one or more DRX parameters. In some embodiments, the multiplier value may comprise a single value by which to multiply each of the one or more DRX parameters. In some embodiments, each of the one or more DRX parameters is rounded, such as to the lowest integer after modification by the multiplier value. For example, the multiplier value may be two such that each DRX parameter is multiplied by 2 and rounded down to the nearest integer value. In some embodiments, the multiplier value may comprise one or more multiplier values by which to multiply one or more corresponding DRX parameters. In some embodiments, each of the one or more DRX parameters is rounded to the lowest integer after modification by the one or more multiplier values. For example, the one or more multiplier values may comprise a multiplier value of two corresponding to the DRX parameter ps–Wakeup and a multiplier value of three corresponding to a DRX parameter drx–InactivityTimerDelta may be defined by the equations:

$$ps\text{--}Wakeup = ps\text{--}Wakeup * 2 \text{ and}$$

$$drx\text{--}InactivityTimerDelta = drx\text{--}InactivityTimerDelta * 3$$

Here, the DRX parameters ps–Wakeup and drx–InactivityTimerDelta are modified by a multiplier amount.

As shown in block 705, the apparatus 300 embodied by a UE, such as UE 201, may include means, such as the processor 302, communication interface 304 or the like, for receiving one or more data bursts from a network entity, such as RAN node 202. In some embodiments, the UE 201 may receive a data burst from the RAN node 202. In some embodiments, the data stream comprises a sequence of one or more data bursts. The RAN node 202 may provide the one or more data bursts based at least in part on the sequence of one or more data bursts. For example, a data stream may be an XR data stream comprising a GOP with the frame sequence "IPPIPP". As such, the RAN node may cause the frames comprising the GOP in order of the frame sequence, e.g., "IPPIPP". In some embodiments, the data burst may be provided to the UE without the selection command. In some embodiments, if no selection command is received, the UE may continue to use the DRX configuration (with or without adaptation) from the previous DRX cycle.

Referring now to FIG. 8, a logic diagram 800 is illustrated that is implemented, for example, by an apparatus 300 embodied by a network entity, such as RAN node 202, to determine if the data stream comprises a fixed pattern of burst classes.

As shown in block 801, the apparatus 300 embodied by a network entity, such as RAN node 202, may include means, such as the processor 302, or the like for determining if the data stream comprises a fixed pattern of data burst classes. In some embodiments, a fixed pattern of burst classes comprises a repeating sequence of data burst classes in a data stream. In some embodiments, the number of data bursts in a data stream sequence may be required to satisfy one or more data burst threshold values. As such, the data class threshold values may limit the number of data bursts and therefore define a minimum number and/or maximum number of repeating data bursts to define a fixed pattern of data bursts. For example, a data stream may be an XR stream comprising a frame sequence "IPPIPP". A minimum data burst threshold value may be three and a maximum data burst threshold value may be 8. As such, the data stream comprising the frame sequence "IPPIPP" satisfies the one or more data burst threshold values and is considered a fixed pattern. As another example, a data stream may be an XR stream comprising a frame sequence "IPPIPPIPP" with the same data burst threshold values. In this case, the data stream comprising the frame sequence "IPPIPPIPP" is not considered a fixed pattern as it fails to satisfy one or more data burst thresholds.

In the instance the data stream is determined not to comprise a fixed pattern of data burst classes, the RAN node 202 may proceed to block 802. As shown in block 802, the apparatus 300 embodied by a network entity, such as RAN node 202, may include means, such as the processor 302, communication interface 304, or the like for causing a selection command to be provided to a UE, such as UE 201. In this instance, the RAN node 202 may determine that the fixed pattern of data burst classes is not known in advance and thus cannot be provided to a UE. As such, the RAN node 202 uses selection commands to indicate whether to apply the one or more adaptive parameters for a next data burst to be transmitted. This may be substantially similar to the process as described with respect to block 604.

In the instance the data stream is determined to comprise a fixed pattern of data burst classes, the RAN node 202 may proceed to block 803. As shown in block 803, the apparatus 300 embodied by a network entity, such as RAN node 202, may include means, such as the processor 302, communication interface 304, or the like for causing an indication of the burst pattern to be provided to a UE, such as UE 201. In some embodiments, the indication of the burst pattern may be provided to the UE during a DRX configuration, such as by using a RRC message. In some embodiments, the indication of the burst pattern may be provided to the UE during a DRX reconfiguration, such as by using a RRC message. As such, the RAN node 202 may avoid using the selection commands to indicate whether to apply the one or more adaptive parameters for a next data burst to be transmitted. In some embodiments, the RAN node 202 may provide an indication of whether to apply the one or more adaptive parameters for the data burst pattern. For example, if a data stream is an XR data stream comprising a fixed pattern of data burst classes of "IPPIPP", the RAN node may provide an indication of "100100", where 1 is indicative to apply the one or more adaptive parameters and 0 is indicative to not apply the one or more adaptive parameters and where the digits of the indication correlate to corresponding digits the fixed pattern, e.g., 1 applies to the first I frame, 0 applies to the first P frame, 0 applies to the second P frame and so forth.

In some embodiments, the RAN node 202 may be configured to monitor for a change in the data stream such that one or more data bursts deviate from the fixed pattern of data burst classes. In the instance that one or more data bursts deviate from the fixed pattern of data burst classes, the RAN node 202 may be configured to determine if the one or more data bursts comprise a fixed pattern of data burst classes as previously described in block 801 and correspondingly perform an RRC reconfiguration.

Referring now to FIG. 9, an example flowchart 900 is illustrated that is implemented, for example, by an apparatus 300 embodied by a UE, such as UE 201, to receive an indication of a burst class pattern.

As shown in block 901, the apparatus 300 embodied by a UE, such as UE 201, may include means, such as the processor 302, communication interface 304, or the like for receiving an indication of a burst class pattern from a network entity, such as RAN node 202. In some embodiments, the indication of the burst pattern is received during a DRX configuration, such as by using a RRC message. In some embodiments, the indication of the burst pattern is received during a DRX reconfiguration, such as by using a RRC message. In some embodiments, the UE may receive an indication of whether to apply the one or more adaptive parameters for the data burst pattern. For example, if a data stream is an XR data stream comprising a fixed pattern of data burst classes of "IPPIPP", the UE 201 may receive a corresponding indication of "100100", where 1 is indicative to apply the one or more adaptive parameters and 0 is indicative to not apply the one or more adaptive parameters.

As shown in block 902, the apparatus 300 embodied by a UE, such as UE 201, may include means, such as the processor 302, or the like for selecting a DRX configuration pattern automatically based at least in part on the next anticipated data burst class. In some embodiments, the UE 201 may receive an indication of whether to apply the one or more adaptive parameters for the data burst pattern. By way of continuing example, if a data stream is an XR data stream comprising a fixed pattern of data burst classes of "IPPIPP", the UE 201 may receive an indication of "100100", where 1 is indicative to apply the one or more adaptive parameters and 0 is indicative to not apply the one or more adaptive parameters. As such the UE may select a DRX configuration pattern of "100100" wherein a DRX configuration value of 1 is indicative to apply the one or more adaptive parameters and a DRX configuration value of 0 is indicative to not apply the one or more adaptive parameters.

FIG. 10 depicts a representation of data stream 100 comprising one or more data bursts 1001-1009. As previously noted, when a data stream has data bursts generated with a non-integer periodicity, that is, data bursts having a non-integer periodicity value. For example, one or more frames comprising an XR data stream may be generated at a rate of 60 frames per second (fps). The interarrival frame time may be calculated by dividing 1 by 60, resulting in a non-integer periodicity value of $16.\overline{6}$ milliseconds. As such, a DRX cycle, which may be configured with an integer DRX cycle duration, such as 16 milliseconds or 17 milliseconds, may eventually result in an accumulated gap as shown in FIG. 10. The accumulated gap may result in the loss and/or delay of one or more data bursts. More specifically, a value i comprising values 1 to infinity, may be used to denote the sequence number that identifies a DRX cycle. Then, a DRX cycle duration $T_{DRX}$ comprising all real numbers and a data stream periodicity $T_{XR}$ comprising all real numbers may be used to define a gap δ. The gap δ may be the drift between a DRX cycle and data stream periodicity. The gap δ may evolve as follows:

$$\begin{cases} \Delta_0 = 0 & i = 0 \\ \Delta_i = \Delta_i + \delta & i = 0 \end{cases}$$

And where:

$$\delta = T_{DRX} - T_{XR}$$

As such, the rate by which the gap δ expands is determined by the number of DRX cycles and the difference between the DRX cycle duration and the data stream periodicity. To address such a gap, it may be beneficial to include one or more resynchronization parameters such that one or more DRX cycles may be adjusted and thus the gap reduced. This may aid in avoiding loss and/or delays of data bursts in a data stream.

In some embodiments, the one or more resynchronization parameters comprise a drx-Compensation (e.g., the amount by which to adjust the DRX cycle), drx-LongCycleCounter (e.g., a counter for the long DRX cycle), drx-Counter (e.g., a counter for the DRX cycle), and drx-PeriodicityDrift (e.g., the amount of drift).

FIG. 11 illustrates a procedure 1100 to configure an adaptive DRX to handle non-integer periodicity of a data stream. In operation 1 of FIG. 11, the RAN node 1102 may cause an adaptive DRX configuration to be provided to UE 1101. In some embodiments, the adaptive DRX configuration may comprise one or more DRX parameters. This may be substantially similar to the procedure described in operation 1 of FIG. 4. In some embodiments, the adaptive DRX configuration may comprise one or more resynchronization parameters.

In some embodiments, the one or more resynchronization parameters may be indicative of a modification value by which to modify the current DRX cycle. In some embodiments, the one or more resynchronization parameters may comprise a periodicity drift value (δ) obtained utilizing the equation $\delta = T_{DRX} - T_{XR}$. In some embodiments, the one or more resynchronization parameters may comprise a periodicity sign value (sign(δ)) indicative of the direction of the drift, e.g. lagging or leading. In some embodiments, the one or more resynchronization parameters may comprise a periodicity cycle (P) indicative of the number of DRX cycles prior to performing the resynchronization. In this particular example, the resynchronization parameters may correspond to values |δ|=0.1, sign(δ)=−1, and P=4.

In operation 2 of FIG. 11, the RAN node 1102 may end the connection configuration. In some embodiments, operations 1 and 2 of FIG. 11 may be provided to UE 1101 using a RRC message.

In operation 3 of FIG. 11, the RAN node 1102 may cause a data burst of the data stream to be provided to the UE 1101. In some embodiments, operation 3 of FIG. 11 may be substantially similar to operation 3 of FIG. 4.

In operation 4 of FIG. 11, the RAN node 1102 may cause a data burst of the data stream to be provided to the UE 1101. In some embodiments, operation 4 of FIG. 11 may be substantially similar to operation 4 of FIG. 4.

In operation 5 of FIG. 11, the RAN node 1102 may cause a data burst of the data stream to be provided to the UE 1101. In some embodiments, operation 5 of FIG. 11 may be substantially similar to operation 5 of FIG. 4.

In operation 6 of FIG. 11, the RAN node 1102 may cause a data burst of the data stream to be provided to the UE 401. Operation 6 corresponds to the fourth DRX cycle and thus, now corresponds to the DRX cycle number as configured in the one or more resynchronization parameters in operation 1. As such, a resynchronization may now be performed. In some embodiments, a resynchronization command is provided to the UE 1101 with the selection command and/or data burst. In some embodiments, the UE 1101 may be configured to automatically perform this resynchronization in response to a resynchronization command, thus conserving network bandwidth. Once this resynchronization is performed, an associated DRX cycle counter associated with UE 1101 and/or RAN node 1102 may be reset. As such, the resynchronization may be performed again at DRX cycle 8

In operation 7 of FIG. 11, the RAN node 1102 may cause a data burst of the data stream to be provided to the UE 1101. In some embodiments, operation 7 of FIG. 11 may be substantially similar to operation 7 of FIG. 4.

Referring now to FIG. 12, an example flowchart 1200 is illustrated that is implemented, for example, by an apparatus 300 embodied by a network entity, such as RAN node 202, to cause a resynchronization command to be provided to the UE.

As shown in block 1201, the apparatus 300 embodied by a network entity, such as RAN node 202, may include means, such as the processor 302, communication interface 304, or the like for causing one or more resynchronization parameters to be provided to a UE, such as UE 201. In some embodiments, the one or more resynchronization parameters may be indicative of a modification value by which to modify the current DRX cycle. In some embodiments, the one or more resynchronization parameters may comprise a periodicity drift value ($\delta$) obtained utilizing the equation $\delta=T_{DRX}-T_{XR}$. In some embodiments, the one or more resynchronization parameters may comprise a periodicity sign value (sign($\delta$)) indicative of the direction of the drift, e.g. lagging or leading. In some embodiments, the one or more resynchronization parameters may comprise a periodicity cycle (P) indicative of the number of DRX cycles prior to performing the resynchronization.

As shown in block 1202, the apparatus 300 embodied by a network entity, such as RAN node 202, may include means, such as the processor 302, communication interface 304, or the like for causing a resynchronization command to be provided to a UE, such as UE 201. In some embodiments, the one or more resynchronization parameters may be indicative of a modification value by which to modify the current DRX cycle. In some embodiments, the resynchronization command may be provided to a UE when the DRX cycle number matches the one or more resynchronization parameters. For example, the one or more resynchronization parameters may correspond to a periodicity cycle of for. As such, a resynchronization command may be transmitted to the UE during the fourth DRX cycle. Once this resynchronization is performed, an associated DRX cycle counter associated with UE 1101 and/or RAN node 1102 may be reset. As such, the resynchronization may be performed again at DRX cycle 8

Referring now to FIG. 13, an example flowchart 1300 is illustrated that is implemented, for example, by an apparatus 300 embodied by a UE, such as UE 201, to modify the current DRX cycle duration by a resynchronization amount.

As shown in block 1301, the apparatus 300 embodied by a UE, such as UE 201, may include means, such as the processor 302, communication interface 304, or the like for receiving a resynchronization command from a network entity, such as network entity 202. In some embodiments, the resynchronization command may be indicative of a resynchronization value by which to modify the current DRX cycle duration.

As shown in block 1302, the apparatus 300 embodied by a UE, such as UE 201, may include means, such as the processor 302, or the like for modifying one or more DRX parameters of a current DRX cycle by a resynchronization amount. As such, the UE 201 may modify the one or more DRX parameters, which may be indicative of the duration of the DRX cycle, by the resynchronization amount as received in the resynchronization command. Thus, the UE 201 may reduce a gap caused by a difference between the DRX cycle duration and the data stream periodicity.

Referring now to FIG. 14, an example flowchart 1400 is illustrated that is implemented, for example, by an apparatus 300 embodied by a UE, such as UE 201, to determine whether to modify the one or more DRX parameters of a current DRX cycle duration by a resynchronization amount.

As shown in block 1401, the apparatus 300 embodied by a UE, such as UE 201, may include means, such as the processor 302, communication interface 304, or the like for receiving one or more resynchronization parameters from a network entity, such as network entity 202. In some embodiments, the one or more resynchronization parameters may be indicative of a modification value by which to modify the current DRX cycle. In some embodiments, the one or more resynchronization parameters may comprise a periodicity drift value ($\delta$) obtained utilizing the equation $\delta=T_{DRX}-T_{XR}$. In some embodiments, the one or more resynchronization parameters may comprise a periodicity sign value (sign($\delta$)) indicative of the direction of the drift, e.g. lagging or leading. In some embodiments, the one or more resynchronization parameters may comprise a periodicity cycle (P) indicative of the number of DRX cycles prior to performing the resynchronization.

As shown in block 1402, the apparatus 300 embodied by a UE, such as UE 201, may include means, such as the processor 302, or the like for determining whether to modify the one or more DRX parameters of a current DRX cycle by a resynchronization amount. In some embodiments, the UE 201 may determine a resynchronization amount based at least in part on the one or more received resynchronization parameters provided in block 1401. In some embodiments, the UE 201 may determine whether to modify the one or more DRX parameters based at least in part on the DRX cycle number and the one or more resynchronization parameters. For example, a resynchronization parameter may be indicative of a DRX cycle number of four. As such, the UE 201 may monitor the DRX cycle count such that it performs the resynchronization for the fourth DRX cycle. In some embodiments, once the resynchronization is performed, an associated DRX cycle counter associated with UE may be reset. As such, the resynchronization may be performed to reset the associated DRX cycle counter and resynchronization may be applied for every fourth DRX cycle.

Referring now to FIG. 15, a logic diagram 1500 is illustrated that is implemented, for example, by an apparatus 300 embodied by a UE, such as UE 201, to determine whether to modify the one or more DRX parameters of a current DRX cycle duration by a resynchronization amount.

As shown in block 1501, the apparatus 300 embodied by a network entity, UE, such as UE 201, may include means, such as the processor 302, or the like for beginning a new DRX cycle i. The value i may be any value between 0 and infinity and may be indicative of the DRX cycle count.

As shown in block 1502, the apparatus 300 embodied by a UE, such as UE 201, may include means, such as the processor 302, or the like for determining if a resynchronization command has been received. In some embodiments, a resynchronization command may be received from a network entity, such as RAN node 202. In some embodiments, the resynchronization command may be received during a selection command. In some embodiments, the resynchronization command may be received by a MAC CE. If a resynchronization command has been received, the UE 201 proceeds to block 1504. If a resynchronization command has not been received, the UE 201 proceeds to block 1503.

As shown in block 1503, the apparatus 300 embodied by a UE, such as UE 201, may include means, such as the processor 302, or the like for determining if the current DRX cycle matches one or more resynchronization parameters. For example, in some embodiments, the UE 201 may determine whether to modify the one or more DRX parameters based at least in part on the DRX cycle number and the one or more resynchronization parameters. For example, a resynchronization parameter may be indicative of a DRX cycle number of four. As such, the UE 201 may monitor the DRX cycle count such that it performs the resynchronization for the fourth DRX cycle. In some embodiments, the UE may determine when the current DRX cycles matches a DRX cycle number by determining if the modulo between the two values equals 0. In the instance the modulo between the current DRX cycle value i and the DRX cycle number P does not equal 0, the UE 201 may proceed to block 1506. In the instance the modulo between the current DRX cycle value i and the DRX cycle number P equals 0, the UE 201 may proceed to block 1504.

As shown in block 1504, the apparatus 300 embodied by a UE, such as UE 201, may include means, such as the processor 302, or the like for performing the resynchronization. In some embodiments, the UE 201 may determine a resynchronization amount based at least in part on the one or more received resynchronization parameters provided in block 1401. In some embodiments, the UE 201 may determine whether to modify the one or more DRX parameters based at least in part on the DRX cycle number and the one or more resynchronization parameters. In some embodiments, the UE 201 may receive the resynchronization amount from a resynchronization command.

As shown in block 1505, the apparatus 300 embodied by a UE, such as UE 201, may include means, such as the processor 302, or the like for resetting the DRX cycle counter to 0. In some embodiments, the value i may be reset to 0. As such, the resynchronization may be performed again after the DRX cycle number has been reached.

As shown in block 1506, the apparatus 300 embodied by a UE, such as UE 201, may include means, such as the processor 302, or the like for incrementing the DRX cycle counter by 1. In some embodiments, the value i may be increased by 1. As such, the DRX cycle counter is updated to reflect the current DRX cycles performed.

As such, a UE may be pre-configured with one or more DRX configuration, which allow the DRX cycle to be more easily controlled by indicating the most suitable DRX configuration for the next data burst comprising the data stream by utilizing one or more adaptive parameters for one or more DRX parameters. This also is a more efficient option as compared to DRX reconfiguration. Additionally, one or more resynchronization parameters may allow a DRX cycle to address an accumulated gap due to a difference in a DRX cycle duration, which may be configured with an integer value, and an associated data stream periodicity, which may have a non-integer value, thus avoiding delay and/or loss of one or more data burst.

FIGS. 4-15 illustrate message flows, flow charts, and/or logic flows (hereinafter generally referenced as "flowcharts") depicting methods according to an example embodiment of the present invention. It will be understood that each block of the message flow may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 306 of an apparatus 300 employing an embodiment of the present invention and executed by a processor 302. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts and message flows support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Although a few variations have been described in detail above, other modifications or additions are possible. In particular, further features and/or variations may be provided in addition to those set forth herein. Moreover, the implementations described above may be directed to various combinations and sub-combinations of the disclosed features and/or combinations and sub-combinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

It should therefore again be emphasized that the various embodiments described herein are presented by way of illustrative example only and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

The invention claimed is:

1. A method comprising:
receiving a data stream comprising one or more data bursts, wherein the one or more data bursts comprise two or more data burst classes, and wherein a data burst class is identified based at least in part on the size of the received data comprising the data burst;
determining one or more values for one or more discontinuous reception parameters and one or more values for one or more adaptive parameters, wherein the one or more adaptive parameters are indicative of a modification value by which to modify the one or more discontinuous reception parameters;
causing a discontinuous reception configuration to be provided to a user equipment, wherein the discontinuous reception configuration comprises the one or more values for the one or more discontinuous reception parameters and an indication of whether to apply the one or more adaptive parameters, wherein the one or more discontinuous receptions parameters are indicative of a discontinuous reception configuration for a particular data burst class;
causing one or more selection commands to be provided to the user equipment, wherein each selection command comprises an indication of whether to apply the one or more adaptive parameters for a next data burst to be transmitted; and
causing the one or more data bursts to be provided to the user equipment.

2. The method of claim 1, wherein the data stream comprises an extended reality stream, wherein the extended reality stream comprises a group of pictures, and wherein the group of pictures comprises one or more data frames, and wherein a data frame can be identified based at least in part on the size.

3. The method of claim 1, wherein the discontinuous reception configuration further comprises the one or more adaptive parameters, wherein the indication whether to apply the one or more adaptive parameters is indicated by a discontinuous reception configuration index.

4. The method of claim 1, wherein the indication whether to apply the one or more adaptive parameters is indicated by one or more multiplier values, and wherein the one or more multiplier values are indicative of one or more values by which to multiply one or more discontinuous adaptive parameters.

5. The method of claim 1, further comprising in an instance the data stream comprises a fixed pattern of data burst classes such that the pattern of data burst classes is known, causing an indication of the data burst class pattern to be provided to the user equipment.

6. The method of claim 1, wherein the one or more values for the one or more discontinuous reception parameters are indicative of at least a discontinuous reception cycle, wherein the discontinuous reception cycle comprises an active period during which a control channel is monitored and a sleeping period during which the control channel is not monitored.

7. The method of claim 1, further comprising:
causing one or more resynchronization parameters to be provided to the user equipment; and
causing a resynchronization command to be provided to the user equipment, wherein the resynchronization command is included in one or more selection commands and causes one or more discontinuous reception parameters of a current discontinuous reception cycle to be modified by a resynchronization amount.

8. The method of claim 5, wherein the resynchronization amount is determined based at least in part on the difference between a duration of the discontinuous reception cycle and a data stream periodicity.

9. The method of claim 1, wherein the discontinuous reception configuration is provided using a radio resource control message and wherein the selection command is embedded in a media access control service data unit or a downlink control indicator.

10. A method comprising:
receiving a discontinuous reception configuration from a network entity, wherein the discontinuous reception configuration comprises one or more values for one or more discontinuous reception parameters and an indication of a particular data burst class to be transmitted, wherein the one or more discontinuous receptions parameters are indicative of a discontinuous reception configuration for a particular data burst class;
selecting one or more discontinuous reception parameters to modify based at least in part on the received indication of a particular data burst class to be transmitted;
receiving one or more selection commands from the network entity, wherein the selection command comprises an indication of the next data burst class to be transmitted;
selecting one or more discontinuous reception parameters to modify based at least in part on the received indication of whether to apply the one or more adaptive parameters after the transmission of a current data burst is complete; and
receiving one or more data bursts from the network entity.

11. The method of claim 10, wherein the discontinuous reception configuration further comprises the one or more adaptive parameters, wherein the indication of the next data burst class to be transmitted is indicated by a discontinuous reception configuration index, and wherein the discontinuous reception configuration index is indicative of whether to apply one or more adaptive parameters to the one or more discontinuous reception parameters.

12. The method of claim 10, wherein the indication of the next data burst class to be transmitted is indicated by one or more multiplier values, and wherein the one or more multiplier values are indicative of one or more values by which to multiply one or more discontinuous adaptive parameters.

13. The method of claim 10, further comprising:
in an instance the data stream comprises a fixed pattern of data burst classes such that the sequence is known by the network entity, receiving an indication of the data burst class pattern; and
selecting a discontinuous reception configuration pattern automatically based at least in part on the next anticipated data burst class in the data burst class pattern.

14. The method of claim 10, wherein the one or more values for the one or more discontinuous reception parameters are indicative of at least a discontinuous reception cycle, wherein a discontinuous reception cycle comprises an active period and a sleeping period, and wherein the method further comprises:
monitoring a control channel during the active period; and
causing corresponding circuitry to turn off during the sleeping period.

15. The method of claim 10, further comprising:
receiving one or more resynchronization parameters from the network entity; and
determining to modify one or more discontinuous reception parameters of a current discontinuous reception cycle by a resynchronization amount based at least in part on the one or more resynchronization parameters.

16. The method of claim 10 further comprising:
receiving a resynchronization command from the network entity, wherein the resynchronization command is included in one or more selection commands; and
modifying one or more discontinuous reception parameters of a current discontinuous reception cycle by a resynchronization amount.

17. The method of claim 15, wherein the resynchronization amount is determined based at least in part on the difference between a duration of the discontinuous reception cycle and a data stream periodicity.

18. The method of claim 10, wherein the adaptive discontinuous reception configuration is received using a radio resource control message and wherein the selection command is embedded in a media access control service data unit or a downlink control indicator.

19. An apparatus comprising:
at least one processor; and
at least one memory including computer program code, the at least one memory and the computer program code configured to, with the at least one processor, cause the apparatus at least to:
receive a discontinuous reception configuration from a network entity, wherein the discontinuous reception configuration comprises one or more values for one or more discontinuous reception parameters and an indication of a particular data burst class to be transmitted, wherein the one or more discontinuous receptions parameters are indicative of a discontinuous reception configuration for a particular data burst class;
select one or more discontinuous reception parameters to modify based at least in part on the received indication of a particular data burst class to be transmitted;
receive one or more selection commands from the network entity, wherein the selection command comprises an indication of the next data burst class to be transmitted;
select one or more discontinuous reception parameters to modify based at least in part on the received indication of whether to apply the one or more adaptive parameters after the transmission of a current data burst is complete; and
receiving one or more data bursts from the network entity.

20. The apparatus of claim 19, wherein the at least one memory and the computer program code are further configured to, with the at least one processor, cause the apparatus at least to:
receive one or more resynchronization parameters from the network entity; and
determine to modify one or more discontinuous reception parameters of a current discontinuous reception cycle by a resynchronization amount based at least in part on the one or more resynchronization parameters.

* * * * *

UNITED STATES PATENT AND TRADEMARK OFFICE
CERTIFICATE OF CORRECTION

PATENT NO. : 11,523,460 B2
APPLICATION NO. : 17/316132
DATED : December 6, 2022
INVENTOR(S) : Stefano Paris et al.

It is certified that error appears in the above-identified patent and that said Letters Patent is hereby corrected as shown below:

On the Title Page

Item (54), and in the Specification, Column 1, Line 2, Title, delete "DISCONTINOUS" and insert -- DISCONTINUOUS --, therefor.

In the Drawings

In sheet 7 of 16, FIG. 6, reference numeral 601, Line 1, delete "COMPISING" and insert -- COMPRISING --, therefor.

In sheet 7 of 16, FIG. 6, reference numeral 603, Line 1, delete "DISCONTINOUS" and insert -- DISCONTINUOUS --, therefor.

In sheet 8 of 16, FIG. 7, reference numeral 701, Line 1, delete "DISCONTINOUS" and insert -- DISCONTINUOUS --, therefor.

In sheet 8 of 16, FIG. 7, reference numeral 702, Line 1, delete "DISCONTINOUS" and insert -- DISCONTINUOUS --, therefor.

In sheet 8 of 16, FIG. 7, reference numeral 704, Line 1, delete "DISCONTINOUS" and insert -- DISCONTINUOUS --, therefor.

In sheet 8 of 16, FIG. 7, reference numeral 705, Line 1, delete "ENITY" and insert -- ENTITY --, therefor.

In sheet 10 of 16, FIG. 9, reference numeral 902, Line 1, delete "DISCONTINOUS" and insert -- DISCONTINUOUS --, therefor.

In sheet 14 of 16, FIG. 13, reference numeral 1302, Line 1, delete "DISCONTINOUS" and insert -- DISCONTINUOUS --, therefor.

Signed and Sealed this
Twenty-seventh Day of June, 2023

Katherine Kelly Vidal
*Director of the United States Patent and Trademark Office*

In sheet 15 of 16, FIG. 14, reference numeral 1402, Line 2, delete "DISCONTINOUS" and insert -- DISCONTINUOUS --, therefor.